(12) United States Patent
Choi et al.

(10) Patent No.: US 11,950,200 B2
(45) Date of Patent: Apr. 2, 2024

(54) ENABLING USER EQUIPMENT (UE) POSITIONING ANCHORS FOR VEHICLE-TO-EVERYTHING (V2X), VEHICLE-TO-VEHICLE (V2V), AND VEHICLE-TO-PEDESTRIAN (V2P) POSITIONING

(71) Applicant: QUALCOMM Incorporated, San Diego, CA (US)

(72) Inventors: Chang-Sik Choi, Hillsborough, NJ (US); Kapil Gulati, Hillsborough, NJ (US); Shuanshuan Wu, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 28 days.

(21) Appl. No.: 17/195,553

(22) Filed: Mar. 8, 2021

(65) Prior Publication Data

US 2022/0015056 A1 Jan. 13, 2022

Related U.S. Application Data

(60) Provisional application No. 63/050,725, filed on Jul. 10, 2020.

(51) Int. Cl.
*H04W 64/00* (2009.01)
*H04W 4/40* (2018.01)

(52) U.S. Cl.
CPC ............ *H04W 64/00* (2013.01); *H04W 4/40* (2018.02)

(58) Field of Classification Search
CPC ......... H04W 64/00; H04W 4/40; H04W 4/44; H04W 4/46; H04W 92/18; H04W 76/14; G01S 1/042; G01S 5/0244
See application file for complete search history.

(56) References Cited

U.S. PATENT DOCUMENTS

| | | | | |
|---|---|---|---|---|
| 2004/0214584 | A1* | 10/2004 | Marinier | H04W 4/021 |
| | | | | 455/406 |
| 2012/0249372 | A1* | 10/2012 | Jovicic | G01S 5/0072 |
| | | | | 342/450 |
| 2016/0360354 | A1* | 12/2016 | Rhee | G01S 5/0252 |
| 2017/0212206 | A1 | 7/2017 | Kim et al. | |
| 2017/0359713 | A1 | 12/2017 | Fodor et al. | |
| 2019/0239181 | A1* | 8/2019 | Gangakhedkar | H04W 64/00 |
| 2021/0377699 | A1* | 12/2021 | Choi | H04L 5/005 |
| 2022/0295442 | A1* | 9/2022 | Goyal | H04W 64/00 |

FOREIGN PATENT DOCUMENTS

EP 3543731 A1 9/2019
WO 2019197036 A1 10/2019

OTHER PUBLICATIONS

International Search Report and Written Opinion—PCT/US2021/036151—ISA/EPO—dated Oct. 1, 2021.

* cited by examiner

*Primary Examiner* — Marcus Hammonds
(74) *Attorney, Agent, or Firm* — Seyfarth Shaw LLP

(57) ABSTRACT

A method of wireless communication by a positioning entity includes determining an accuracy of a positioning estimate of a first non-anchor sidelink user equipment (UE). The method also includes determining the accuracy satisfies an accuracy condition. The method further includes configuring the first non-anchor sidelink UE as a first anchor UE based on the positioning estimate satisfying the accuracy condition.

23 Claims, 12 Drawing Sheets

ENABLING USER EQUIPMENT (UE) POSITIONING ANCHORS FOR VEHICLE-TO-EVERYTHING (V2X), VEHICLE-TO-VEHICLE (V2V), AND VEHICLE-TO-PEDESTRIAN (V2P) POSITIONING

CROSS-REFERENCE TO RELATED APPLICATION

The present application claims the benefit of U.S. Provisional Patent Application No. 63/050,725, filed on Jul. 10, 2020, and titled "ENABLING USER EQUIPMENT (UE) POSITIONING ANCHORS FOR VEHICLE-TO-EVERYTHING (V2X), VEHICLE-TO-VEHICLE (V2V), AND VEHICLE-TO-PEDESTRIAN (V2P) POSITIONING," the disclosure of which is assigned to the assignee hereof and expressly incorporated herein in its entirety.

FIELD OF THE DISCLOSURE

Aspects of the present disclosure generally relate to wireless communication, and more particularly to techniques and apparatuses for new radio (NR) procedures to declare non-anchor user equipments (UEs) as anchor UEs for vehicle-to-everything (V2X), vehicle-to-vehicle (V2V) and vehicle-to-pedestrian (V2P) positioning.

BACKGROUND

Wireless communication systems are widely deployed to provide various telecommunications services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunications standards to provide a common protocol that enables different wireless devices to communicate on a municipal, national, regional, and even global level. An example telecommunications standard is fifth generation (5G) new radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the fourth generation (4G) long term evolution (LTE) standard. There exists a need for further improvements in 5G NR technology. These improvements may also be applicable to other multi-access technologies and the telecommunications standards that employ these technologies.

Wireless communication systems may include or provide support for various types of communication systems, such as vehicle related communication systems (e.g., vehicle-to-everything (V2X) communication systems). Vehicle related communication systems may be used by vehicles to increase safety and to help prevent collisions of vehicles. Information regarding inclement weather, nearby accidents, road conditions, and/or other information may be conveyed to a driver via the vehicle related communication system. In some cases, sidelink UEs, such as vehicles, may communicate directly with each other using device-to-device (D2D) communication over a D2D wireless link. These communications can be referred to as sidelink communications.

As the demands for sidelink communication increase, different sidelink communication systems may compete for the same wireless communication resources. Additionally, some sidelink UEs may be power limited. Accordingly, it may be desirable to improve the efficiency of sidelink wireless communication.

SUMMARY

In one aspect of the present disclosure, a method for wireless communication by a positioning entity includes determining an accuracy of a positioning estimate of a first non-anchor sidelink UE. The method further includes determining the accuracy satisfies an accuracy condition. The method still further includes configuring the first non-anchor sidelink UE as a first anchor UE based on the positioning estimate satisfying the accuracy condition.

Another aspect of the present disclosure is directed to an apparatus for wireless communication by a positioning entity. The apparatus includes means for determining an accuracy of a positioning estimate of a first non-anchor sidelink UE. The apparatus further includes means for determining the accuracy satisfies an accuracy condition. The apparatus still further includes means for configuring the first non-anchor sidelink UE as a first anchor UE based on the positioning estimate satisfying the accuracy condition.

In another aspect of the present disclosure, a non-transitory computer-readable medium with non-transitory program code recorded thereon is disclosed. The program code is executed by a processor and includes program code to determine an accuracy of a positioning estimate of a first non-anchor sidelink UE. The program code further includes program code to determine the accuracy satisfies an accuracy condition. The program code still further includes program code to configure the first non-anchor sidelink UE as a first anchor UE based on the positioning estimate satisfying the accuracy condition.

Another aspect of the present disclosure is directed to an apparatus wireless communication by a positioning entity. The apparatus having a memory and one or more processors coupled to the memory. The processor(s) is configured to determine an accuracy of a positioning estimate of a first non-anchor sidelink UE. The processor(s) is further configured to determine the accuracy satisfies an accuracy condition. The processor(s) is still further configured to configure the first non-anchor sidelink UE as a first anchor UE based on the positioning estimate satisfying the accuracy condition.

Aspects generally include a method, apparatus, system, computer program product, non-transitory computer-readable medium, user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
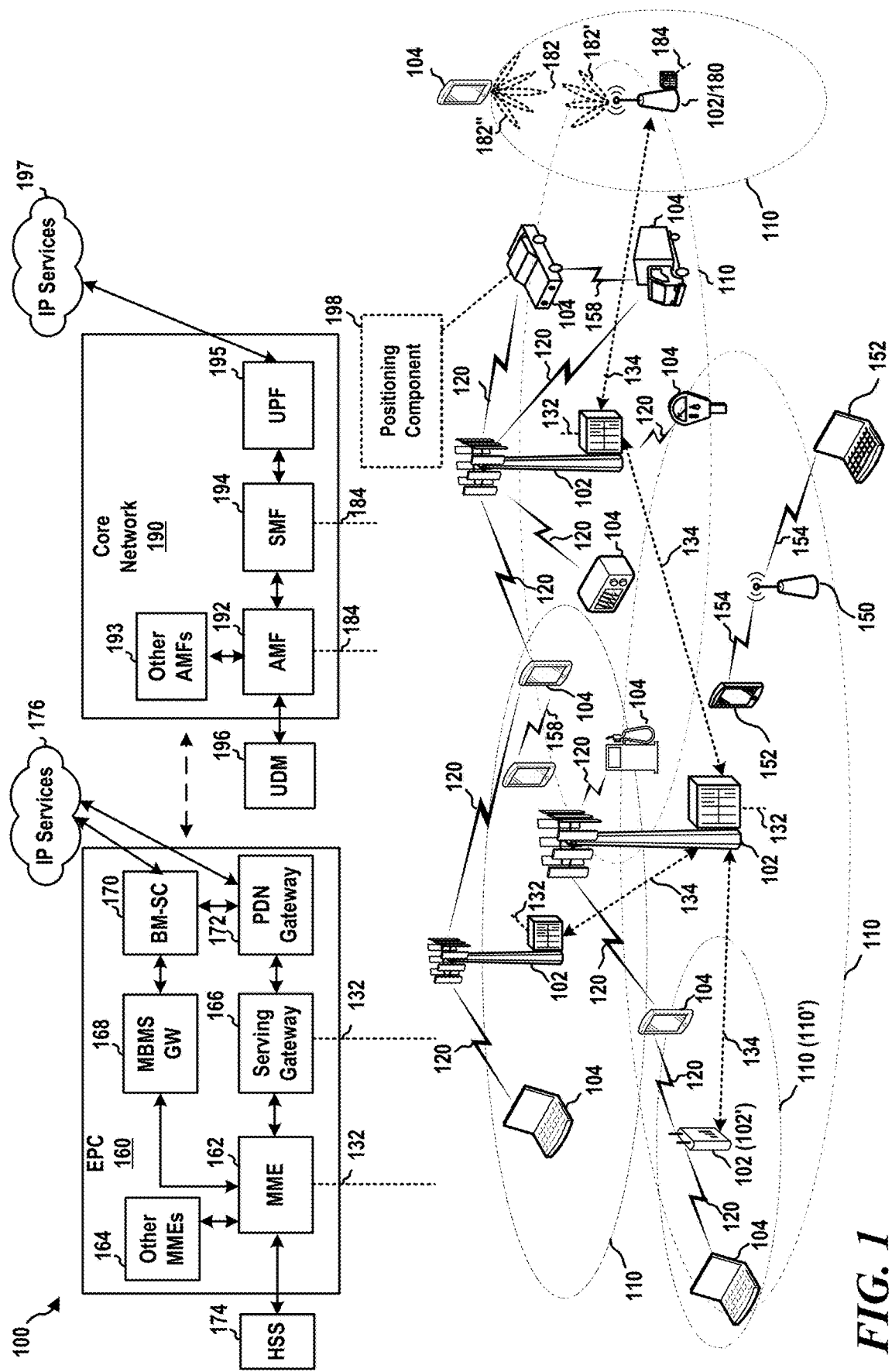
FIG. 1 is a diagram illustrating an example of a wireless communication system and an access network.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure disclosed, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communication systems, such as and including 3G and/or 4G technologies.

In cellular communication networks, wireless devices may generally communicate with each other via one or more network entities such as a base station or scheduling entity. Some networks may support device-to-device (D2D) communication that enable discovery of, and communication with nearby devices using a direct link between devices (e.g., without passing through a base station, relay, or another node). D2D communication can enable mesh networks and device-to-network relay functionality. Some examples of D2D technology include Bluetooth pairing, Wi-Fi Direct, Miracast, and LTE-D. D2D communication may also be referred to as point-to-point (P2P) or sidelink communication.

D2D communication may be implemented using licensed or unlicensed bands. Additionally, D2D communication can avoid the overhead involving the routing to and from the base station. Therefore, D2D communication can improve throughput, reduce latency, and/or increase energy efficiency.

A type of D2D communication may include vehicle-to-everything (V2X) communication. V2X communication may assist autonomous vehicles in communicating with each other. For example, autonomous vehicles may include multiple sensors (e.g., light detection and ranging (LiDAR), radar, cameras, etc.). In most cases, the autonomous vehicle's sensors are line of sight sensors. In contrast, V2X communication may allow autonomous vehicles to communicate with each other for non-line of sight situations.

Sidelink (SL) communication refers to the communication among user equipment (UEs) without tunneling through a base station (BS) and/or a core network. Sidelink communication can be communicated over a physical sidelink control channel (PSCCH) and a physical sidelink shared channel (PSSCH). The PSCCH and PSSCH are similar to a physical downlink control channel (PDCCH) and a physical downlink shared channel (PDSCH) in downlink (DL) communication between a BS and a UE. For instance, the PSCCH may carry sidelink control information (SCI) and the PSSCH may carry sidelink data (e.g., user data). Each PSCCH is associated with a corresponding PSSCH, where SCI in a PSCCH may carry reservation and/or scheduling information for sidelink data transmission in the associated PSSCH. Use cases for sidelink communication may include, among others, vehicle-to-everything (V2X), industrial Internet of things (IIoT), and/or NR-lite.

In cellular communication networks, wireless devices may generally communicate with each other via one or more network entities, such as a base station and/or a scheduling entity. Some networks may support device-to-device (D2D) communication to discover and communicate with one or more devices using a direct link between the devices (e.g., without passing through a base station, relay, or another node). D2D communication can enable mesh networks and device-to-network relay functionality. Some examples of D2D technology include Bluetooth pairing, Wi-Fi Direct, Miracast, and LTE-D. D2D communication may also be referred to as point-to-point (P2P) or sidelink communication.

D2D communication may be implemented using licensed or unlicensed bands. Additionally, D2D communication can avoid overhead caused from routing to and from the base station. Therefore, D2D communication can improve throughput, reduce latency, and/or increase energy efficiency.

A type of D2D communication may include vehicle-to-everything (V2X) communication. V2X communication may assist autonomous vehicles in communicating with each other by overcoming line of sight limitations. For example, autonomous vehicles may include multiple sensors (e.g., light detection and ranging (LiDAR), radar, cameras, etc.). In conventional systems, communication opportunities may be limited when one or more of the multiple sensors is a line of sight sensor. In contrast, V2X communication is not limited to line of sight. Therefore, V2X communication may provide additional communication opportunities for vehicles, such as autonomous vehicles.

In sidelink positioning, road side units may transmit positioning reference signals (PRSs) and intelligent transportation system (ITS) messages associated with the positioning reference signals. A receiver may determine a distance between the receiver and a source of the positioning reference signals based on a time difference of arrival (TDoA). As an example, the intelligent transportation system message includes the location of the positioning reference signal source and a time when the positioning reference signal message was transmitted. The receiver may determine the distance between the receiver and positioning reference signal source based on the location of the positioning reference signal source, the time of transmission, and a time of arrival. That is, the receiver may derive its own position if an absolute position of the positioning reference signal source is known.

A non-anchor user equipment (UE), such as a vehicle or a pedestrian, may position itself with respect to an anchor UE, such as a road side unit (RSU). The non-anchor UE is an example of a sidelink (SL) UE. It is desirable to improve non-anchor UE positioning to reduce positioning errors in a distributed positioning system. According to aspects of the present disclosure, distributed positioning system errors may be reduced by designating a non-anchor UE as an anchor UE when positioning estimates of the non-anchor UE satisfy accuracy criteria. As described, the non-anchor UEs and the anchor UEs of the current disclosure may be sidelink UEs.

In one configuration, a positioning entity determines an accuracy of a positioning estimate of a non-anchor UE (e.g., sidelink UE). The accuracy of the positioning estimate may be determined based on a confidence value of the positioning estimate. The confidence value may be configured at the positioning entity. In the current configuration, the positioning entity may declare the non-anchor UE as an anchor UE when the positioning estimate is accurate. The positioning entity may be the non-anchor UE, an anchor UE, or a sidelink server.

In one configuration, the confidence value is determined based on a comparison of a predicted observation error variance and an expected observation error variance. In another configuration, the confidence value is determined based on whether positioning estimates from independent sensors coincide. Alternatively, the confidence value is based on whether measurements from independent sensors coincide with each other. In another example, the confidence value is based on previous innovations from a Kalman filter.

According to another aspect of the present disclosure, a positioning entity transmits a positioning reference signal (PRS). An anchor status may be indicated along with the PRS. In one configuration, the indication occurs with a PRS sequence. Alternatively, the indication may occur in a message coupled to the PRS. In one configuration, the positioning entity transmits an intelligent transportation system (ITS) message when the positioning entity is an anchor device. The positioning entity may refrain from transmitting an ITS message when the positioning entity is not an anchor device.

FIG. 1 is a diagram illustrating an example of a wireless communication system and an access network 100. The wireless communication system (also referred to as a wireless wide area network (WWAN)) includes base stations 102, UEs 104, an evolved packet core (EPC) 160, and another core network 190 (e.g., a 5G core (5GC)). The base stations 102 may include macrocells (high power cellular base station) and/or small cells 102' (low power cellular base station). The macrocells include base stations. The small cells 102' include femtocells, picocells, and microcells.

The base stations 102 configured for 4G LTE (collectively referred to as evolved universal mobile telecommunication system (UMTS) terrestrial radio access network (E-UTRAN)) may interface with the EPC 160 through backhaul links 132 (e.g., S1 interface). The base stations 102 configured for 5G NR (collectively referred to as next generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include home evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc., MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communication systems, such as FlashLinQ, WiMedia, Bluetooth, ZigBee, Wi-Fi based on the IEEE 802.11 standard, LTE, or NR.

The wireless communication system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (e.g., gNB), or another type of base station. Some base stations, such as gNB 180 may operate in a traditional sub 6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station. Extremely high frequency (EHF) is part of the radio frequency (RF) in the electromagnetic spectrum. EHF has a range of 30 GHz to 300 GHz and a wavelength between 1 millimeter and 10 millimeters. Radio waves in the band may be referred to as a millimeter wave. Near mmWave may extend down to a frequency of 3 GHz with a wavelength of 100 millimeters. The super high frequency (SHF) band extends between 3 GHz and 30 GHz, also referred to as centimeter wave. Communications using the mmWave/near mmWave radio frequency band (e.g., 3 GHz-300 GHz) has extremely high path loss and a short range. The mmWave base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a mobility management entity (MME) 162, other MMES 164, a serving gateway 166, a multimedia broadcast multicast service (MBMS) gateway 168, a broadcast multicast service center (BM-SC) 170, and a packet data network (PDN) gateway 172. The MME 162 may be in communication with a home subscriber server (HSS) 174. The MME 162 is the control node that processes the signaling between the UEs 104 and the EPC 160. Generally, the MME 162 provides bearer and connection management. All user Internet protocol (IP) packets are transferred through the serving gateway 166, which itself is connected to the PDN gateway 172. The PDN gateway 172 provides UE IP address allocation as well as other functions. The PDN gateway 172 and the BM-SC 170 are connected to the IP services 176. The IP services 176 may include the Internet, an intranet, an IP multimedia subsystem (IMS), a PS streaming service, and/or other IP services. The BM-SC 170 may provide functions for MBMS user service provisioning and delivery. The BM-SC 170 may serve as an entry point for content provider MBMS transmission, may be used to authorize and initiate MBMS bearer services within a public land mobile network (PLMN), and may be used to schedule MBMS transmissions. The MBMS gateway 168 may be used to distribute MBMS traffic to the base stations 102 belonging to a multicast broadcast single frequency network (MBSFN) area broadcasting a particular service, and may be responsible for session management (start/stop) and for collecting evolved MBMS (eMBMS) related charging information.

The core network 190 may include an access and mobility management function (AMF) 192, other AMFs 193, a session management function (SMF) 194, and a user plane function (UPF) 195. The AMF 192 may be in communication with a unified data management (UDM) 196. The AMF 192 is the control node that processes the signaling between the UEs 104 and the core network 190. Generally, the AMF 192 provides quality of service (QoS) flow and session management. All user Internet protocol (IP) packets are transferred through the UPF 195. The UPF 195 provides UE IP address allocation as well as other functions. The UPF 195 is connected to the IP services 197. The IP services 197 may include the Internet, an intranet, an IP multimedia subsystem (IMS), a PS streaming service, and/or other IP services.

The base station 102 may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., a parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, a receiving device, such as the UE 104, may include a positioning component 198 configured to determine whether a positioning estimate of a non-anchor sidelink UE is accurate. In one configuration, the UE 104 is the non-anchor sidelink UE. The positioning component 198 may also be configured to declare the non-anchor UE 104 to be an anchor UE when the positioning estimate is accurate. The positioning component 198 may also be configured to transmit a positioning reference signal (PRS). The positioning component 198 may further be configured to indicate an anchor status along with the PRS.

Although the following description may be focused on 5G NR, it may be applicable to other similar areas, such as LTE, LTE-A, CDMA, GSM, and other wireless technologies.

Although the following description may be focused on 5G NR, it may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplex (FDD) in which for a particular set of subcarriers (carrier system bandwidth), subframes within the set of subcarriers are dedicated for either DL or UL, or may be time division duplex (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-S-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu * 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 $\mu$s.

A resource grid may represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment/negative acknowledgment (ACK/NACK) feedback. The PUSCH carries data, and may additionally be used to carry a buffer status report (BSR), a power headroom report (PHR), and/or UCI.

Figure 3:
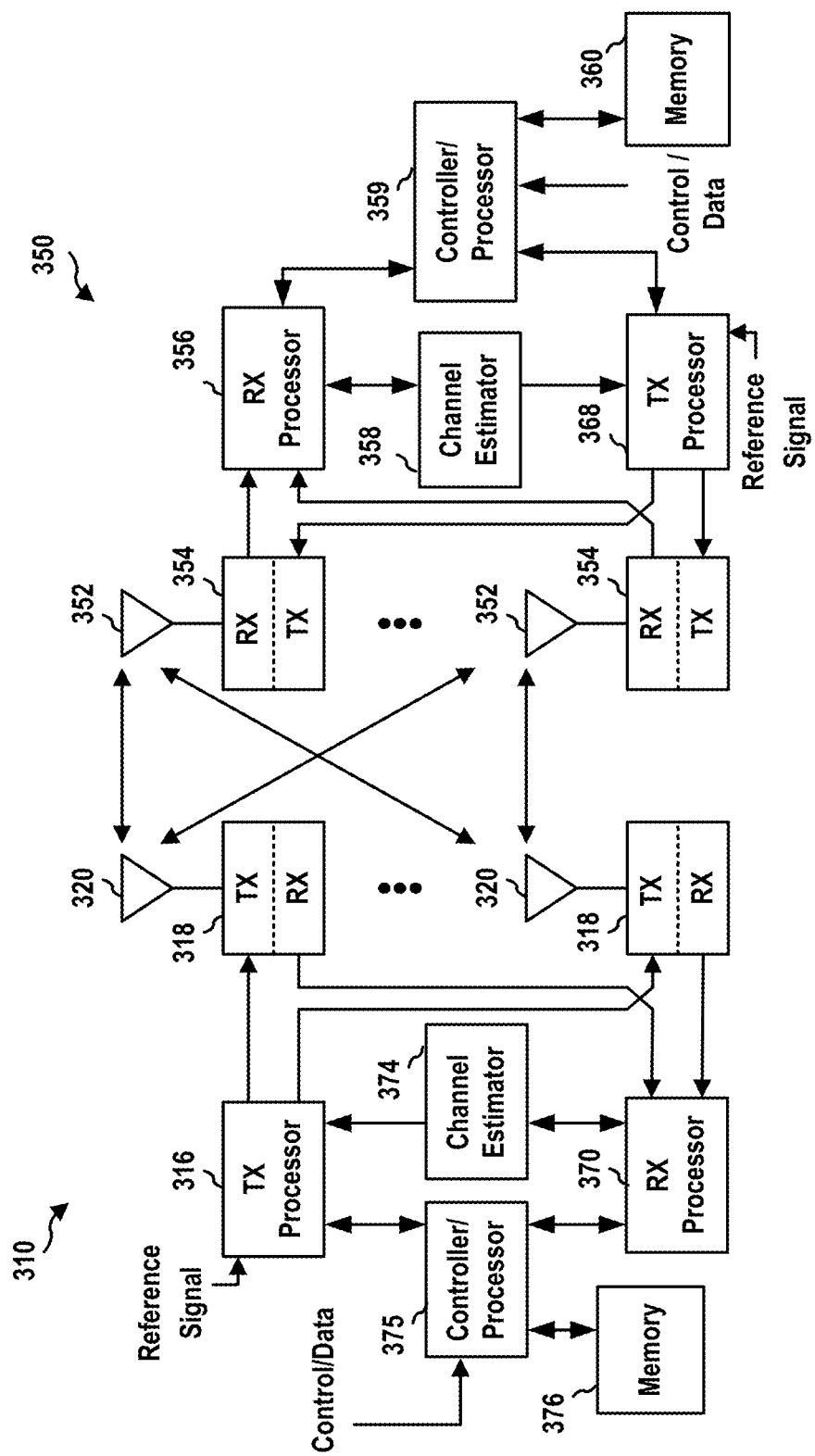
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate a radio frequency (RF) carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBS) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the positioning component 198 of FIG. 1. Additionally, at least one of the TX processor 316, the RX processor 370, and the controller/processor 375 may be configured to perform aspects in connection with the positioning component 198 of FIG. 1.

Figure 4:
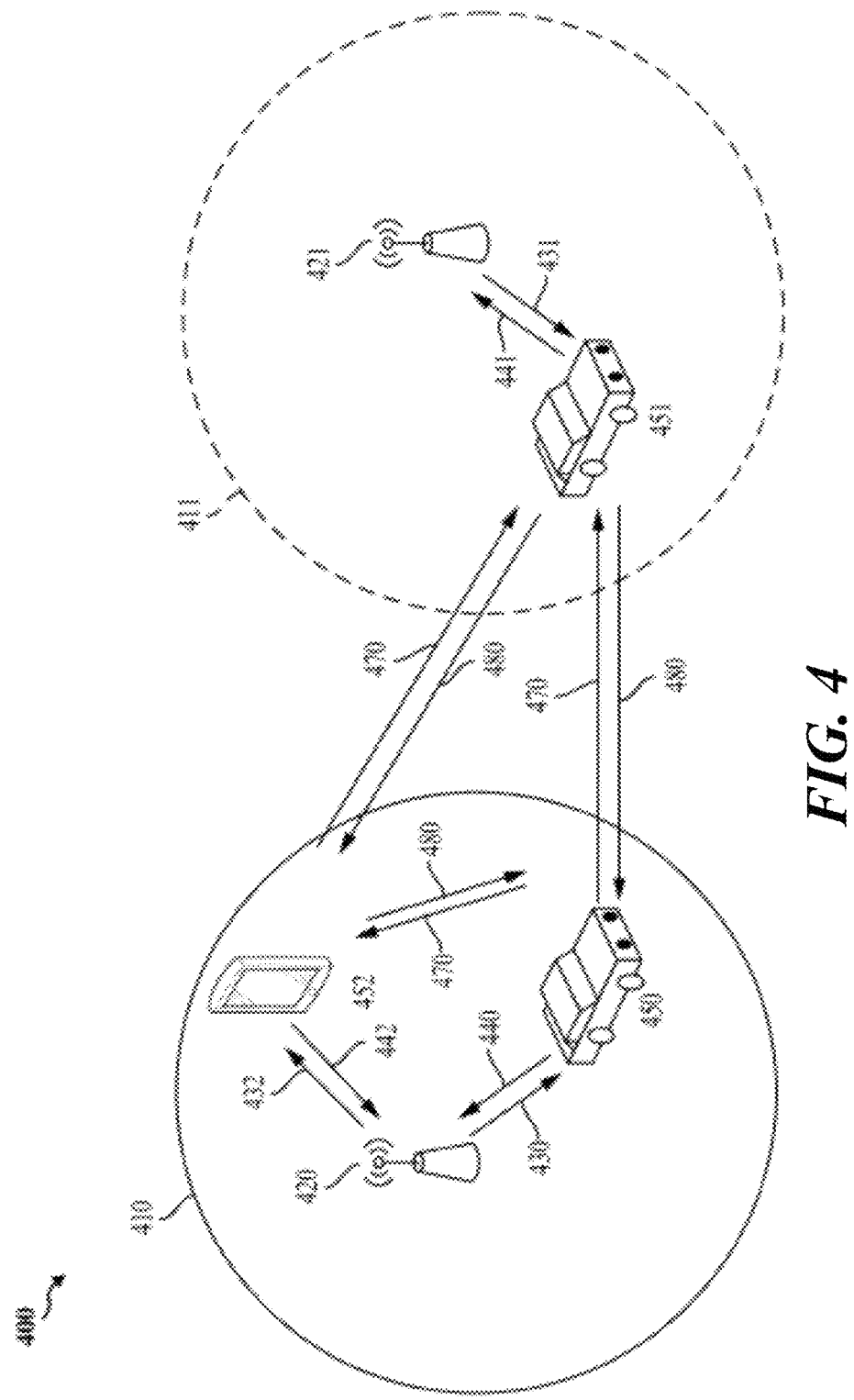
FIG. 4 is a diagram illustrating an example of a vehicle-to-everything (V2X) system, in accordance with various aspects of the present disclosure.

FIG. 4 is a diagram of a device-to-device (D2D) communication system 400, including V2X communication, in accordance with various aspects of the present disclosure. For example, the D2D communication system 400 may include V2X communication, (e.g., a first UE 450 communicating with a second UE 451). In some aspects, the first UE 450 and/or the second UE 451 may be configured to communicate in a licensed radio frequency spectrum and/or a shared radio frequency spectrum. The shared radio frequency spectrum may be unlicensed, and therefore multiple different technologies may use the shared radio frequency spectrum for communication, including new radio (NR), LTE, LTE-Advanced, licensed assisted access (LAA), dedicated short range communication (DSRC), MuLTEFire, 4G, and the like. The foregoing list of technologies is to be regarded as illustrative, and is not meant to be exhaustive.

The D2D communication system 400 may use NR radio access technology. Of course, other radio access technologies, such as LTE radio access technology, may be used. In D2D communication (e.g., V2X communication or vehicle-to-vehicle (V2V) communication), the UEs 450, 451 may be on networks of different mobile network operators (MNOs). Each of the networks may operate in its own radio frequency spectrum. For example, the air interface to a first UE 450 (e.g., Uu interface) may be on one or more frequency bands different from the air interface of the second UE 451. The first UE 450 and the second UE 451 may communicate via a sidelink component carrier, for example, via the PC5 interface. In some examples, the MNOs may schedule sidelink communication between or among the UEs 450, 451 in licensed radio frequency spectrum and/or a shared radio frequency spectrum (e.g., 5 GHz radio spectrum bands).

The shared radio frequency spectrum may be unlicensed, and therefore different technologies may use the shared radio frequency spectrum for communication. In some aspects, a D2D communication (e.g., sidelink communication) between or among UEs 450, 451 is not scheduled by MNOs. The D2D communication system 400 may further include a third UE 452.

The third UE 452 may operate on the first network 410 (e.g., of the first MNO) or another network, for example. The third UE 452 may be in D2D communication with the first UE 450 and/or second UE 451. The first base station 420 (e.g., gNB) may communicate with the third UE 452 via a downlink (DL) carrier 432 and/or an uplink (UL) carrier 442. The DL communication may be use various DL resources (e.g., the DL subframes (FIG. 2A) and/or the DL channels (FIG. 2B)). The UL communication may be performed via the UL carrier 442 using various UL resources (e.g., the UL subframes (FIG. 2C) and the UL channels (FIG. 2D)).

Figure 2:
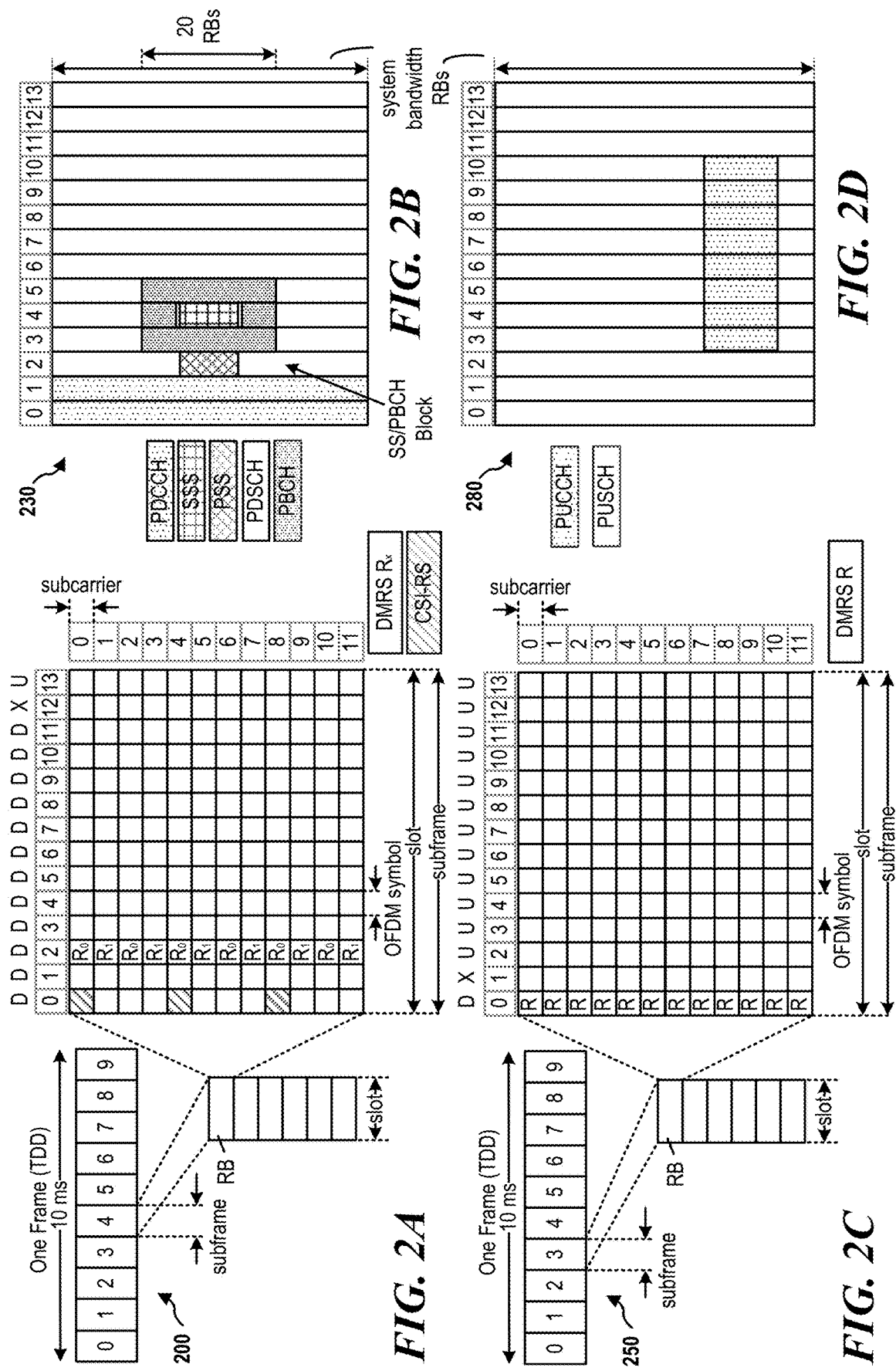
FIGS. 2A, 2B, 2C, and 2D are diagrams illustrating examples of a first fifth generation (5G) new radio (NR) frame, downlink (DL) channels within a 5G NR subframe, a second 5G NR frame, and uplink (UL) channels within a 5G NR subframe, respectively.

The first network 410 operates in a first frequency spectrum and includes the first base station 420 (e.g., gNB) communicating at least with the first UE 450, for example, as described in FIGS. 1-3. The first base station 420 (e.g., gNB) may communicate with the first UE 450 via a DL carrier 430 and/or an UL carrier 440. The DL communication may be use various DL resources (e.g., the DL subframes (FIG. 2A) and/or the DL channels (FIG. 2B)). The UL communication may be performed via the UL carrier 440 using various UL resources (e.g., the UL subframes (FIG. 2C) and the UL channels (FIG. 2D)).

In some aspects, the second UE 451 may be on a different network from the first UE 450. In some aspects, the second UE 451 may be on a second network 411 (e.g., of the second MNO). The second network 411 may operate in a second frequency spectrum (e.g., a second frequency spectrum different from the first frequency spectrum) and may include the second base station 421 (e.g., gNB) communicating with the second UE 451, for example, as described in FIGS. 1-3.

The second base station 421 may communicate with the second UE 451 via a DL carrier 431 and an UL carrier 441. The DL communication are performed via the DL carrier 431 using various DL resources (e.g., the DL subframes (FIG. 2A) and/or the DL channels (FIG. 2B)). The UL communication are performed via the UL carrier 441 using various UL resources (e.g., the UL subframes (FIG. 2C) and/or the UL channels (FIG. 2D)).

In conventional systems, the first base station 420 and/or the second base station 421 assign resources to the UEs for device-to-device (D2D) communication (e.g., V2X communication and/or V2V communication). For example, the resources may be a pool of UL resources, both orthogonal (e.g., one or more frequency division multiplexing (FDM) channels) and non-orthogonal (e.g., code division multiplexing (CDM)/resource spread multiple access (RSMA) in each channel). The first base station 420 and/or the second base station 421 may configure the resources via the PDCCH (e.g., faster approach) or RRC (e.g., slower approach).

In some systems, each UE 450, 451 autonomously selects resources for D2D communication. For example, each UE 450, 451 may sense and analyze channel occupation during the sensing window. The UEs 450, 451 may use the sensing information to select resources from the sensing window. As discussed, one UE 451 may assist another UE 450 in performing resource selection. The UE 451 providing assistance may be referred to as the receiver UE or partner UE, which may potentially notify the transmitter UE 450. The transmitter UE 450 may transmit information to the receiving UE 451 via sidelink communication.

The D2D communication (e.g., V2X communication and/or V2V communication) may be carried out via one or more sidelink carriers 470, 480. The one or more sidelink carriers 470, 480 may include one or more channels, such as a physical sidelink broadcast channel (PSBCH), a physical sidelink discovery channel (PSDCH), a physical sidelink shared channel (PSSCH), and a physical sidelink control channel (PSCCH), for example.

In some examples, the sidelink carriers 470, 480 may operate using the PC5 interface. The first UE 450 may transmit to one or more (e.g., multiple) devices, including to the second UE 451 via the first sidelink carrier 470. The second UE 451 may transmit to one or more (e.g., multiple) devices, including to the first UE 450 via the second sidelink carrier 480.

In some aspects, the UL carrier 440 and the first sidelink carrier 470 may be aggregated to increase bandwidth. In some aspects, the first sidelink carrier 470 and/or the second sidelink carrier 480 may share the first frequency spectrum (with the first network 410) and/or share the second frequency spectrum (with the second network 411). In some aspects, the sidelink carriers 470, 480 may operate in an unlicensed/shared radio frequency spectrum.

In some aspects, sidelink communication on a sidelink carrier may occur between the first UE 450 and the second UE 451. In an aspect, the first UE 450 may perform sidelink communication with one or more (e.g., multiple) devices, including the second UE 451 via the first sidelink carrier 470. For example, the first UE 450 may transmit a broadcast transmission via the first sidelink carrier 470 to the multiple devices (e.g., the second and third UEs 451, 452). The second UE 451 (e.g., among other UEs) may receive such broadcast transmission. Additionally or alternatively, the first UE 450 may transmit a multicast transmission via the first sidelink carrier 470 to the multiple devices (e.g., the second and third UEs 451, 452). The second UE 451 and/or the third UE 452 (e.g., among other UEs) may receive such multicast transmission. The multicast transmissions may be connectionless or connection-oriented. A multicast transmission may also be referred to as a groupcast transmission.

Furthermore, the first UE 450 may transmit a unicast transmission via the first sidelink carrier 470 to a device, such as the second UE 451. The second UE 451 (e.g., among other UEs) may receive such unicast transmission. Additionally or alternatively, the second UE 451 may perform sidelink communication with one or more (e.g., multiple) devices, including the first UE 450 via the second sidelink carrier 480. For example, the second UE 451 may transmit a broadcast transmission via the second sidelink carrier 480 to the multiple devices. The first UE 450 (e.g., among other UEs) may receive such broadcast transmission.

In another example, the second UE 451 may transmit a multicast transmission via the second sidelink carrier 480 to the multiple devices (e.g., the first and third UEs 450, 452). The first UE 450 and/or the third UE 452 (e.g., among other UEs) may receive such multicast transmission. Further, the second UE 451 may transmit a unicast transmission via the second sidelink carrier 480 to a device, such as the first UE 450. The first UE 450 (e.g., among other UEs) may receive such unicast transmission. The third UE 452 may communicate in a similar manner.

In some aspects, for example, such sidelink communication on a sidelink carrier between the first UE 450 and the second UE 451 may occur without having MNOs allocating resources (e.g., one or more portions of a resource block (RB), slot, frequency band, and/or channel associated with a sidelink carrier 470, 480) for such communication and/or without scheduling such communication. Sidelink communication may include traffic communication (e.g., data communication, control communication, paging communication and/or system information communication). Further, sidelink communication may include sidelink feedback communication associated with traffic communication (e.g., a transmission of feedback information for previously-received traffic communication). Sidelink communication may employ at least one sidelink communication structure having at least one feedback symbol. The feedback symbol of the sidelink communication structure may allot for any sidelink feedback information that may be communicated in the device-to-device (D2D) communication system 400 between devices (e.g., a first UE 450, a second UE 451, and/or a third UE 452). As discussed, a UE may be a vehicle (e.g., UE 450, 451), a mobile device (e.g., 452), or another type of device. In some cases, a UE may be a special UE, such as a road side unit (RSU).

Figure 5:
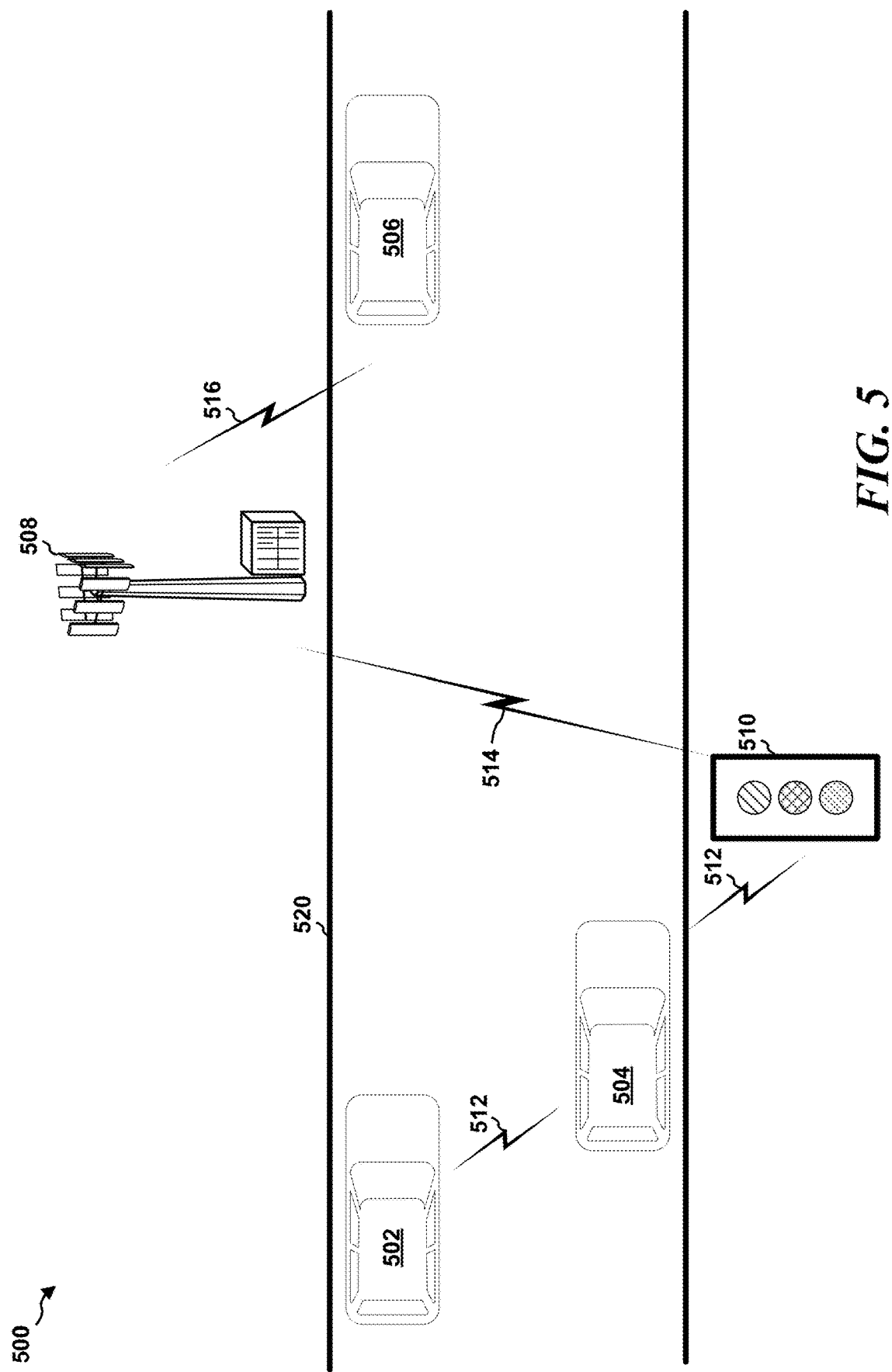
FIG. 5 is a block diagram illustrating an example of a vehicle-to-everything (V2X) system with a road side unit (RSU), according to aspects of the present disclosure.

FIG. 5 illustrates an example of a V2X system 500 with an RSU 510 according to aspects of the present disclosure. As shown in FIG. 5, a transmitter UE 504 transmits data to an RSU 510 and a receiving UE 502 via sidelink transmissions 512. Additionally, or alternatively, the RSU 510 may transmit data to the transmitter UE 504 via a sidelink transmission 512. The RSU 510 may forward data received from the transmitter UE 504 to a cellular network (e.g., gNB) 508 via an UL transmission 514. The gNB 508 may transmit the data received from the RSU 510 to other UEs 506 via a DL transmission 516. The RSU 510 may be incorporated with traffic infrastructure (e.g., traffic light, light pole, etc.) For example, as shown in FIG. 5, the RSU 510 is a traffic signal positioned at a side of a road 520. Additionally or alternatively, RSUs 510 may be stand-alone units.

Figure 6:
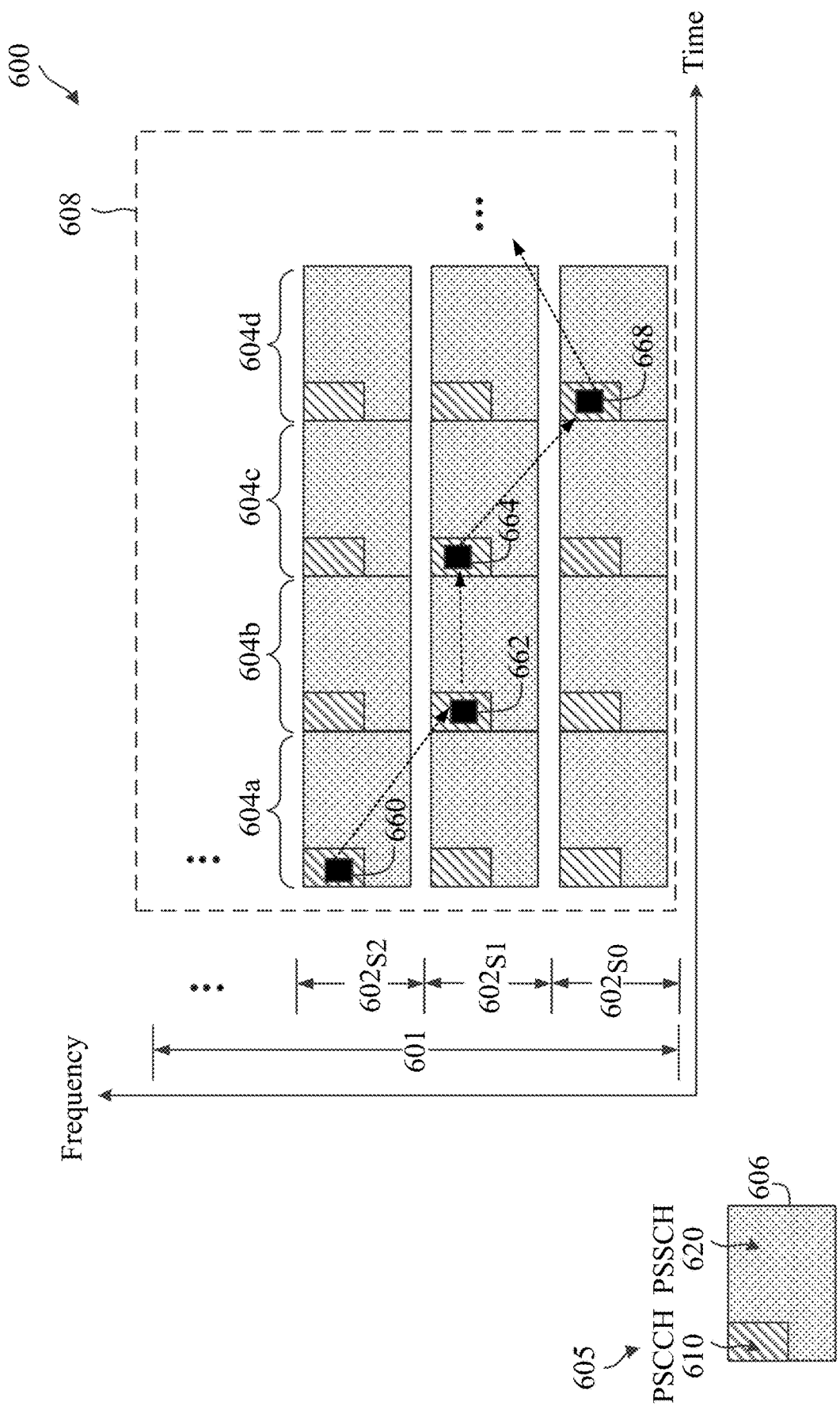
FIG. 6 illustrates a sidelink communication scheme, in accordance with various aspects of the present disclosure.

FIG. 6 illustrates a sidelink communication scheme 600, according to some aspects of the present disclosure. The scheme 600 may be employed by UEs such as the UEs 104 in a network such as the network 100. In FIG. 6, the x-axis represents time and the y-axis represents frequency.

In the scheme 600, a shared radio frequency band 601 is partitioned into multiple subchannels or frequency subbands 602 (shown as $602_{S0}$, $602_{S1}$, $602_{S2}$) in frequency and multiple sidelink frames 604 (shown as 604a, 604b, 604c, 604d) in time for sidelink communication. The frequency band 601 may be at any suitable frequencies. The frequency band 601 may have any suitable bandwidth (BW) and may be partitioned into any suitable number of frequency subbands 602. The number of frequency subbands 602 can be dependent on the sidelink communication BW requirement.

Each sidelink frame 604 includes a sidelink resource 606 in each frequency subband 602. A legend 605 indicates the types of sidelink channels within a sidelink resource 606. In some instances, a frequency gap or guard band may be specified between adjacent frequency subbands 602, for example, to mitigate adjacent band interference. The sidelink resource 606 may have a substantially similar structure as an NR sidelink resource. For instance, the sidelink resource 606 may include a number of subcarriers or RBs in frequency and a number of symbols in time. In some instances, the sidelink resource 606 may have a duration between about one millisecond (ms) to about 20 ms. Each sidelink resource 606 may include a PSCCH 610 and a PSSCH 620. The PSCCH 610 and the PSSCH 620 can be multiplexed in time and/or frequency. In the example of FIG. 6, for each sidelink resource 606, the PSCCH 610 is located during the beginning symbol(s) of the sidelink resource 606 and occupies a portion of a corresponding frequency subband 602, and the PSSCH 620 occupies the remaining time-frequency resources in the sidelink resource 606. In some instances, a sidelink resource 606 may also include a physical sidelink feedback channel (PSFCH), for example, located during the ending symbol(s) of the sidelink resource 606. In general, a PSCCH 610, a PSSCH 620, and/or a PSFCH may be multiplexed within a sidelink resource 606.

The PSCCH 610 may carry SCI 660 and/or sidelink data. The sidelink data can be of various forms and types depending on the sidelink application. For instance, when the sidelink application is a V2X application, the sidelink data may carry V2X data (e.g., vehicle location information, traveling speed and/or direction, vehicle sensing measurements, etc.). Alternatively, when the sidelink application is an IIoT application, the sidelink data may carry IIoT data (e.g., sensor measurements, device measurements, temperature readings, etc.). The PSFCH can be used for carrying feedback information, for example, HARQ ACK/NACK for sidelink data received in an earlier sidelink resource 606.

In an NR sidelink frame structure, the sidelink frames 604 in a resource pool 608 may be contiguous in time. A sidelink UE (e.g., the UEs 104) may include, in SCI 660, a reservation for a sidelink resource 606 in a later sidelink frame 604. Thus, another sidelink UE (e.g., a UE in the same NR-U sidelink system) may perform SCI sensing in the resource pool 608 to determine whether a sidelink resource 606 is available or occupied. For instance, if the sidelink UE detected SCI indicating a reservation for a sidelink resource 606, the sidelink UE may refrain from transmitting in the reserved sidelink resource 606. If the sidelink UE determines that there is no reservation detected for a sidelink resource 606, the sidelink UE may transmit in the sidelink resource 606. As such, SCI sensing can assist a UE in identifying a target frequency subband 602 to reserve for sidelink communication and to avoid intra-system collision with another sidelink UE in the NR sidelink system. In some aspects, the UE may be configured with a sensing window for SCI sensing or monitoring to reduce intra-system collision.

In some aspects, the sidelink UE may be configured with a frequency hopping pattern. In this regard, the sidelink UE may hop from one frequency subband 602 in one sidelink frame 604 to another frequency subband 602 in another sidelink frame 604. In the illustrated example of FIG. 6, during the sidelink frame 604a, the sidelink UE transmits SCI 660 in the sidelink resource 606 located in the frequency subband $602_{S2}$ to reserve a sidelink resource 606 in a next sidelink frame 604b located at the frequency subband $602_{S1}$. Similarly, during the sidelink frame 604b, the sidelink UE transmits SCI 662 in the sidelink resource 606 located in the frequency subband $602_{S1}$ to reserve a sidelink resource 606 in a next sidelink frame 604c located at the frequency subband $602_{S1}$. During the sidelink frame 604c, the sidelink UE transmits SCI 664 in the sidelink resource 606 located in the frequency subband $602_{S1}$ to reserve a sidelink resource 606 in a next sidelink frame 604d located at the frequency subband $602_{S0}$. During the sidelink frame 604d, the sidelink UE transmits SCI 668 in the sidelink resource 606 located in the frequency subband $602_{S0}$. The SCI 668 may reserve a sidelink resource 606 in a later sidelink frame 604.

The SCI can also indicate scheduling information and/or a destination identifier (ID) identifying a target receiving sidelink UE for the next sidelink resource 606. Thus, a sidelink UE may monitor SCI transmitted by other sidelink UEs. Upon detecting SCI in a sidelink resource 606, the sidelink UE may determine whether the sidelink UE is the target receiver based on the destination ID. If the sidelink UE is the target receiver, the sidelink UE may proceed to receive and decode the sidelink data indicated by the SCI. In some aspects, multiple sidelink UEs may simultaneously communicate sidelink data in a sidelink frame 604 in different frequency subband (e.g., via frequency division multiplexing (FDM)). For instance, in the sidelink frame 604b, one pair of sidelink UEs may communicate sidelink data using a sidelink resource 606 in the frequency subband $602_{S2}$ while another pair of sidelink UEs may communicate sidelink data using a sidelink resource 606 in the frequency subband $602_{S1}$.

In some aspects, the scheme 600 is used for synchronous sidelink communication. That is, the sidelink UEs may be synchronized in time and are aligned in terms of symbol boundary, sidelink resource boundary (e.g., the starting time of sidelink frames 604). The sidelink UEs may perform synchronization in a variety of forms, for example, based on sidelink synchronization signal blocks (SSBs) received from a sidelink UE and/or NR-U SSBs received from a BS (e.g., the BSs 105 and/or 205) while in-coverage of the BS. In some aspects, the sidelink UE may be preconfigured with the resource pool 608 in the frequency band 601, for example, while in coverage of a serving BS. The resource pool 608 may include a plurality of sidelink resources 606. The BS can configure the sidelink UE with a resource pool configuration indicating resources in the frequency band 601 and/or the subbands 602 and/or timing information associated with the sidelink frames 604. In some aspects, the scheme 600 includes mode-2 RRA (e.g., supporting autonomous radio resource allocation (RRA) that can be used for out-of-coverage sidelink UEs or partial-coverage sidelink UEs).

In a vehicular environment, a vehicle may leverage its speed sensor for position estimation. As an example, the vehicle may estimates its position with respect to a location of a road side unit (RSU). This type of positioning may be referred to as vehicle-to-infrastructure (V2I) positioning. Alternatively, the vehicle may position itself with regard to other vehicles. This type of positioning may be referred to as vehicle-to-vehicle (V2V) positioning.

Figure 7A:
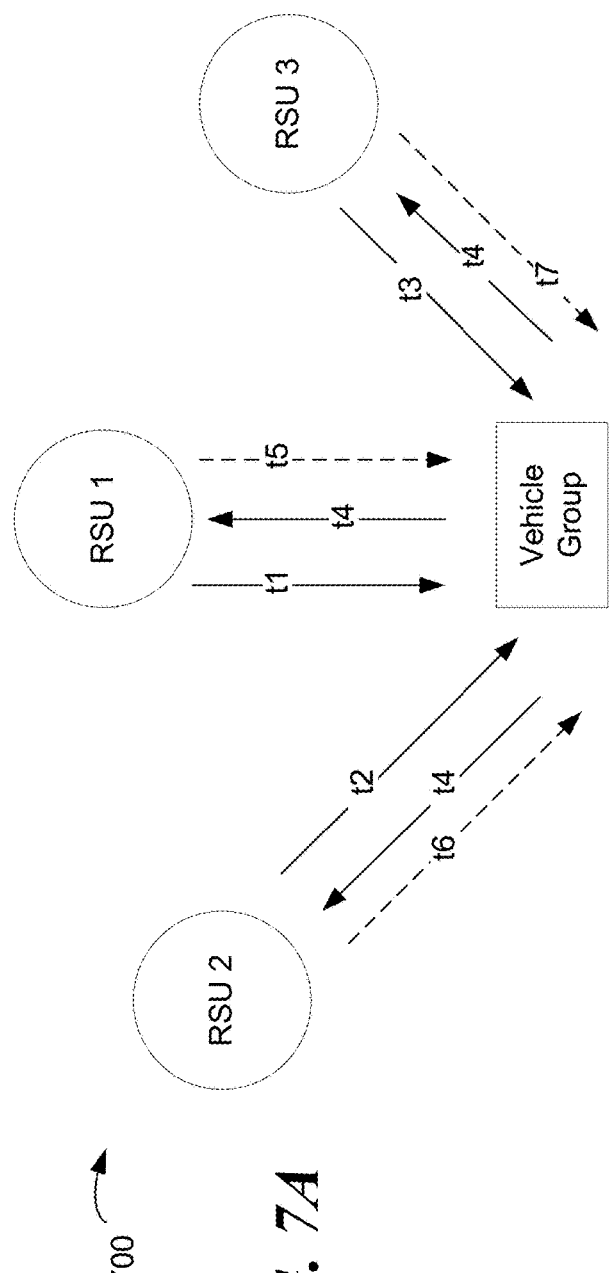
FIG. 7A illustrates an example of a positioning reference signal (PRS) exchange between RSUs and a vehicle.

Position reference signals (PRSs) may be transmitted with a pre-defined periodicity, such as a 100 msec soft periodicity. Each position reference signal exchange may include a number of phases. FIG. 7A illustrates an example 700 of a position reference signal exchange between RSUs and a vehicle. At a first phase (phase 1), RSUs and vehicles are grouped together in the unlicensed spectrum. As shown in FIG. 7A, in one example, the groups may include RSU groups (shown as RSU 1, RSU 2, and RSU 3) and a vehicle group. Each RSU group may include one or more RSUs, and each vehicle group may include one or more vehicles. The RSUs and vehicles may be grouped based on grouping criteria, such as relative locations or speed. Each group may be characterized as an initiator or a responder. Additionally, each group may initiate coexistence techniques, such as listen-before-talk (LBT).

During a second phase (phase 2), the RSUs and vehicles transmit position reference signals on an unlicensed spectrum. As shown in FIG. 7A, the position reference signals may be transmitted at different time instances. For example, at time t1, RSU 1 transmits a position reference signal. Additionally, RSU 2 transmits a position reference signal (time t2), then RSU 3 transmits a position reference signal (time t3), and then the vehicle group transmits a position reference signal (time t4) to the RSUs. The position reference signal may be broadcast. For example, as shown in FIG. 7A, the position reference signal transmitted by the vehicle group, at time t4, is broadcast to each RSU group (RSU 1, RSU 2, RSU 3).

During a third phase (phase 3), the RSUs and vehicles broadcast intelligent transportation system (ITS) messages on an intelligent transportation system spectrum. Each ITS message corresponds to a position reference signal transmitted by the position reference signal source, such as a position reference signal group. The intelligent transportation system message may include a position reference signal source position, position reference signal message timing information, a position reference signal source ID, a position reference signal bandwidth, group information, and/or additional clock information. As shown in FIG. 7A, at time t5, RSU 1 transmits an intelligent transportation system message. Additionally, RSU 2 transmits an intelligent transportation system message (time t6), and RSU 3 transmits an intelligent transportation system message (time t7).

Figure 7B:
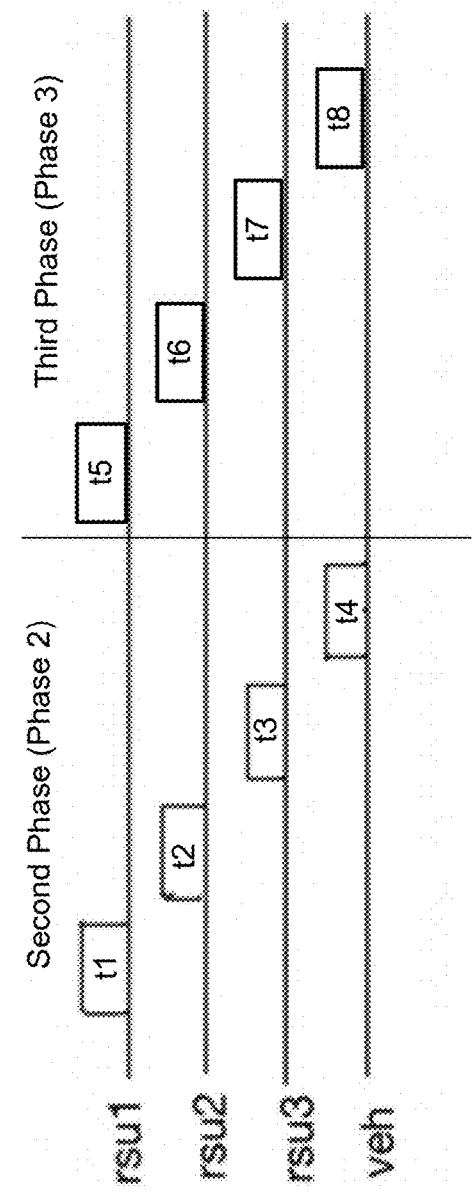
FIG. 7B is a timing diagram illustrating an example of a PRS exchange.

FIG. 7B is a timing diagram 750 illustrating an example of a PRS exchange. The timing diagram 750 is based on the position reference signal exchange example 700 of FIG. 7A. In the example of FIG. 7B, at a first phase, the RSUs and vehicles were grouped. At a second phase, as shown in FIG. 7B, at time t1, RSU 1 transmits a position reference signal. Additionally, RSU 2 transmits a position reference signal (time t2), then RSU 3 transmits a position reference signal (time t3), and then the vehicle group transmits a position reference signal (time t4).

As shown in FIG. 7B, during a third phase (phase 3), the RSUs and vehicles transmit intelligent transportation system messages on an intelligent transportation system spectrum. In the example of FIG. 7B, at time t5, RSU 1 transmits an ITS message. Additionally, RSU 2 transmits an intelligent transportation system message (time t6), then RSU 3 transmits an intelligent transportation system message (time t7), and then the vehicle group transmits a position reference signal (time t8). The vehicle may transmit an intelligent transportation system message (time t8) if the vehicle is an anchor. That is, a sidelink device may refrain from transmitting an intelligent transportation system message when it is not an anchor device.

Figure 8:
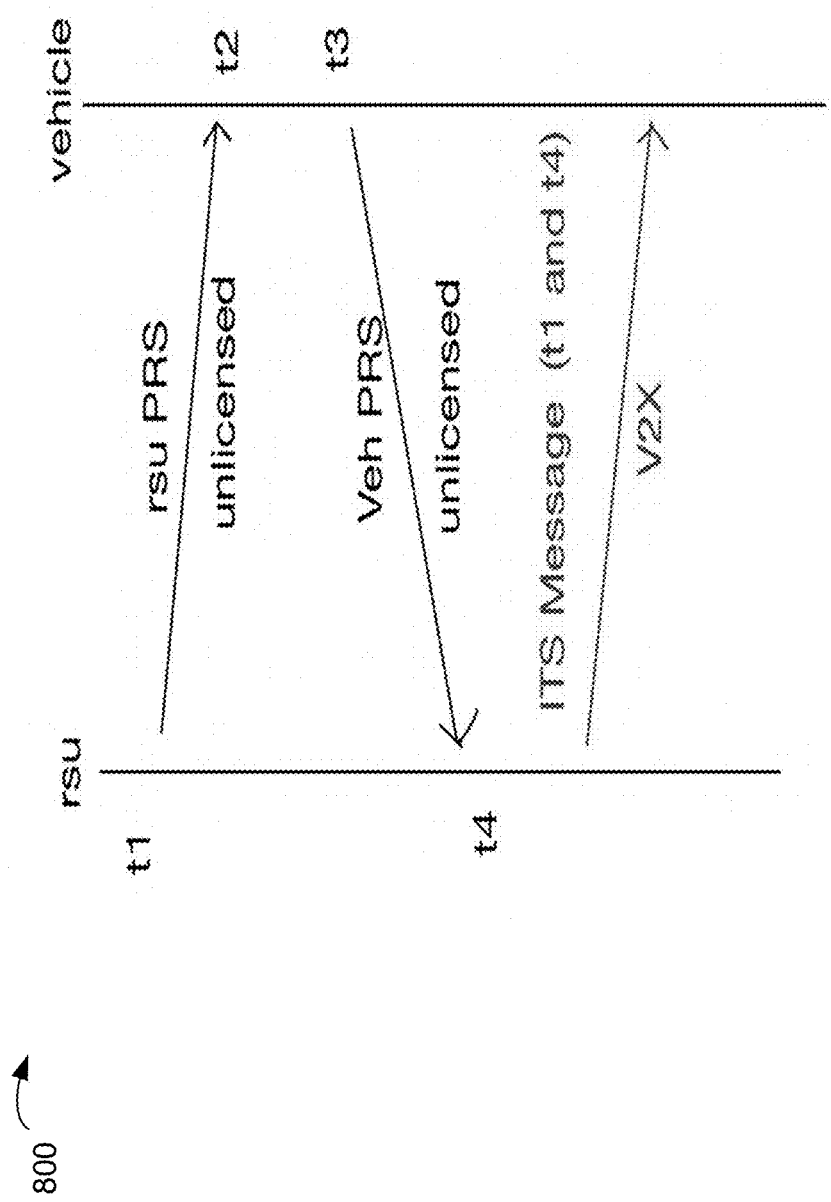
FIG. 8 is a timing diagram illustrating an example of a PRS exchange.

As described, a position reference signal exchange may include different phases. FIG. 8 is a timing diagram 800 illustrating an example of a position reference signal exchange. As shown in FIG. 8, at time t1, a position reference signal (PRS) is broadcast from an RSU on an unlicensed spectrum. For ease of explanation, the position reference signal transmitted from the RSU may be referred to as an RSU position reference signal. At time t2, a vehicle receives the position reference signal broadcast from the RSU. At time t3, the vehicle broadcasts a position reference signal on the unlicensed spectrum. For ease of explanation, the position reference signal transmitted from the vehicle may be referred to as a vehicle position reference signal (veh PRS as shown in FIG. 8). At time t4, an intelligent transportation system message (ITS) is broadcast from the RSU. The intelligent transportation system message may include timing information for the RSU PRS transmission (time t1) and timing information for reception of the veh PRS (time t4). The information provided in the intelligent transportation system message may be used for round trip time (RTT) computations.

For example, the vehicle may determine a timing delay based on timing information known to the vehicle and timing information provided in the intelligent transportation system message. The vehicle may be aware of a time when the RSU PRS transmission was received (time t2) and a time when the veh PRS was transmitted (time t3). As described, the intelligent transportation system message may include timing information for the RSU position reference signal transmission (time t1) and timing information for reception of the veh PRS (time t4). Therefore, based on the timing information for times t1, t2, t3, and t4, as shown in FIG. 8, the vehicle may determine a timing difference of arrival (TDoA) as (t4−t3)+(t2−t1). As described, the ITS message may also provide the location of the RSU. Therefore, based on the location of the RSU (rsu in EQUATION 1), the speed of light ($v_{light}$), and the TDoA ((t4−t3)+(t2−t1)), the vehicle may determine its own position (veh in EQUATION 1):

$$\frac{2\|rsu - veh\|}{v_{light}} = (t_4 - t_3) + (t_2 - t_1) \tag{1}$$

Due to the local oscillator or antenna group delay at the transmitter (tx) and the receiver (rx), each local time (t) at the receiver and the transmitter is determined as:

$$\tilde{t} = t + \alpha(tx, rx) + b\tilde{t}, \tag{2}$$

where $\alpha$ is a bias, b is a drift, and $\tilde{t}$ is a time at the receiver or transmitter. In EQUATION 2, the bias $\alpha$ is function of whether the local time is determined for the transmitter or the receiver. FIG. 8 illustrates an example of the vehicle receiving a position reference signal and an ITS message from one RSU. A vehicle may position itself based on position reference signals received from multiple RSUs, or position reference signals received at multiple time instances from one or more RSU.

An RSU may know its position because RSUs are stationary. In this example, the RSU may be referred to as an anchor RSU because the RSU knows its position. An ITS message transmitted from an RSU may indicate the RSU's position (e.g., location). In some examples, a vehicle may not be aware of its own position. In this example, the vehicle may be referred to as a non-anchor vehicle because the vehicle does not know its position.

Both the anchor RSU and the non-anchor vehicle may transmit position reference signals. For example, the anchor RSUs and the non-anchor vehicles transmit position reference signals at the second phase as described with reference to FIGS. 7A, 7B, and 8. Anchor RSUs may also transmit intelligent transportation system messages. For example, the anchor RSUs may transmit intelligent transportation system messages at the third phase as described with reference to FIGS. 7A, 7B, and 8. The intelligent transportation system messages may be transmitted if positioning calculations are performed at the non-anchor vehicle. As described, the position reference signal and ITS message(s) may be used for determining a round-trip time (RTT).

For a non-anchor UE, such as a non-anchor vehicle or a pedestrian, position calculations may be performed at the UE itself, at one or more anchor UEs, one or more servers, and/or one or more devices executing a sidelink location management function (S-LMF). For ease of explanation, the non-anchor vehicle and the pedestrian may be referred to as non-anchor UEs. The non-anchor UEs are not limited to vehicles and pedestrians. Other types of road users, such as scooters, cyclists, and non-road users are contemplated. The UE may be embedded in the non-anchor entity or carried by the non-anchor entity (e.g., a pedestrian carrying a wireless phone). In some cases, one or more anchors may independently or jointly perform position calculations for non-anchor UEs. The joint position calculations may be performed via one or more message exchanges, such as RSUs sharing observations with each other. In other cases, anchor devices and/or non-anchor UEs may send their observations (for example, time difference of arrival (TDoA), angle of arrival (AOA), etc.) and any additional information (for example, velocity estimate of the vehicle, anchors location, etc.) to the server. The server may compute the position of a device (e.g., anchor device or non-anchor UE) based on the observations received from the device.

As described, aspects of the present disclosure may be implemented in a distributed positioning system. Additionally, aspects of the present disclosure may improve non-anchor device positioning to reduce an accumulated error in the distributed positioning system.

As previously described, in some cases, a non-anchor UE may position itself with respect to an anchor road side unit (RSU). In other cases, the non-anchor UE may position itself with respect to non-stationary devices, such as non-stationary anchors and/or non-anchor UEs. To improve positioning, in one configuration, a device (e.g., RSU, UE, vehicle, etc.) indicates whether it is an anchor or a non-anchor. The indication may be provided during a position reference signal (PRS) sequence (e.g., phase 2) or an intelligent transportation system (ITS) message (e.g., phase 3). By indicating whether a device is an anchor or a non-anchor, a first non-anchor device, such as a non-anchor UE, may exclude information from a second non-anchor device, such as a second non-anchor UE, when the first non-anchor device is determining its own position.

Figure 9:
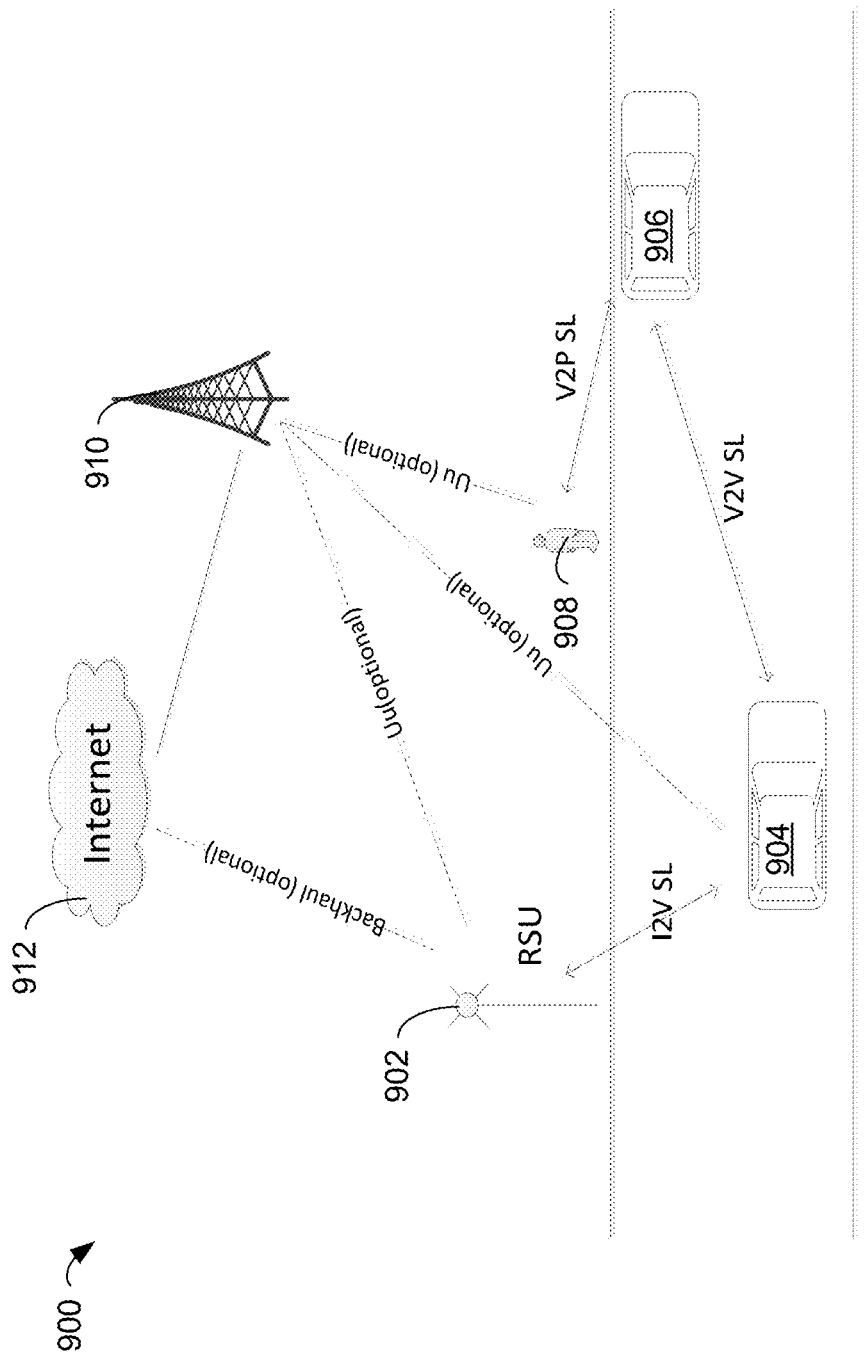
FIG. 9 is a block diagram illustrating an example of a positioning system, in accordance with aspects of the present disclosure.

FIG. 9 illustrates an example of a positioning system 900, in accordance with aspects of the present disclosure. As shown in FIG. 9, the positioning system 900 includes a stationary anchor, such as an RSU 902, and non-stationary anchors, such as a first vehicle 904 and/or a pedestrian 908. In the example of FIG. 9, the RSU 902, the first vehicle 904, and the pedestrian 908 may optionally communicate with a base station 910 via a radio interface (shown as Uu interface) of a cellular network, such as an LTE network or an NR network. In the example of FIG. 9, it is assumed the first vehicle 904, a second vehicle 906, and the pedestrian 908 communicate via a UE. The UE may be an embedded UE (e.g., embedded in the first vehicle 904 and the second vehicle 906) or a carried UE (e.g., carried by the pedestrian 908). The communications of the first vehicle 904, second vehicle 906, and the pedestrian 908 are not limited to UE communications, the communications may be performed by other types of communication devices.

In the example of FIG. 9, the RSU 902 is a fixed point device. Therefore, the position of the RSU 902 may be considered accurate (e.g., a confidence is above a threshold). Additionally, the RSU 902 may be an example of a fixed anchor device. In the example of FIG. 9, the RSU 902 may also exchange backhaul messages with other devices via the Internet 912. The first vehicle 904 may determine its position based on infrastructure-to-vehicle (I2V) sidelink (SL) messages exchanged with the RSU 902, messages exchanged with the base station 910, and/or information received from a positioning system, such as a global navigation satellite system (GNSS). Therefore, an accuracy of the first vehicle's 904 position estimates may be above a threshold. Thus, the first vehicle 904 may be considered a non-stationary anchor device. However, the first vehicle 904 may not declare itself as an anchor device until confirmed by a positioning entity.

Additionally, in the example of FIG. 9, the pedestrian 908 may determine its position based on messages exchanged with the base station 910 and/or other information, such as information received from a positioning system. Therefore, an accuracy of the pedestrian's 908 position estimates may be above an accuracy threshold. Thus, the pedestrian 908 may be a non-stationary anchor when the accuracy of the pedestrian's 908 position estimates are greater than the accuracy threshold. However, the pedestrian 908 may not declare itself as an anchor device until confirmed by a positioning entity. That is, the pedestrian 908 may be a dynamic anchor device.

In the example of FIG. 9, the second vehicle 906 may communicate with the first vehicle 904 via vehicle-to-vehicle (V2V) sidelink messages. The second vehicle 906 may also communicate with the pedestrian 908 via vehicle-to-pedestrian (V2P) sidelink messages. Although the pedestrian 908 and the first vehicle 904 may be considered anchor UEs, confidence of the second vehicle's 906 position estimates may be less than a threshold. Therefore, the second vehicle 906 may be a non-anchor UE.

As described, the pedestrian 908 and/or the first vehicle 904 may be considered anchor UEs. Still, in the example of FIG. 9, the pedestrian 908 and the first vehicle 904 are not labeled as anchor UEs until a positioning entity determines that the position estimates are accurate (e.g., above a confidence threshold). For ease of explanation, the description below will discuss the first vehicle 904. Still, the description is applicable to the pedestrian 908, as well as the second vehicle 906. For example, an accuracy of the second vehicle's 906 position estimates may increase over time, such that the second vehicle 906 may also be labeled as an anchor when an accuracy of the second vehicle's 906 position estimates are greater than the accuracy threshold.

In one configuration, a positioning entity declares the first vehicle 904 as an anchor UE based on the position estimates of the first vehicle 904 satisfying accuracy criteria (e.g., the accuracy is greater than an accuracy threshold). The first vehicle 904 may be an example of a dynamic anchor device. In one example, the positioning entity is the first vehicle 904. In another example, the positioning entity is one or more of the fixed anchor devices (e.g., the RSU 902 and/or the base station 910) specified for determining a position of a non-anchor device, such as the second vehicle 906. In another example, the positioning entity is a device executing a sidelink location management function or a server determining the position of the first vehicle 904 based on measurement from the anchor devices (e.g., the RSU 902 and/or the base station 910) and the first vehicle 904.

In one configuration, a position reference signal of the first vehicle 904 may include an anchor indication based on the first vehicle 904 being labeled an anchor. The indication may be provided in the position reference signal or as one or more message bits in a message coupled with the position reference signal. Alternatively, an intelligent transportation message of the first vehicle 904 may include an anchor indication based on the first vehicle 904 being labeled an anchor.

As described, the positioning entity may determine the position estimate of a non-anchor UE is accurate based on the position estimate satisfying accuracy criteria. In one configuration, the accuracy criteria is satisfied (e.g., the position estimate is considered accurate) when a confidence (e.g., confidence value) of the position estimate is greater than a confidence threshold. The confidence threshold may be configured via a configuration message or pre-configured at the positioning entity.

In one configuration, a confidence value of the position estimate is based on a difference between a predicted observation error variance and an expected observation error variance. The confidence value may be greater than a confidence threshold when the predicted observation error variance is less than the expected observation error variance.

In another configuration, the confidence value is based on whether prediction estimates of independent sensors coincide with each other. For example, the confidence value is increased when the prediction estimates of independent sensors coincide with each other. In another implementation, the confidence value is based on a similarity of positions independently produced by infrastructure-to-vehicle (I2V) ranging and a global positioning system (GPS). As an example, the confidence value increases when the positions are the same.

In another implementation, the position estimate produced by I2V ranging is stabilized. The confidence value may be based on an output of a Kalman filter. As an example, the confidence value may be above the confidence threshold if an output of the Kalman filter is converging. As another example, the confidence value is based on whether a number of previous innovations (e.g., output prediction error) of the Kalman filter are within an error level and have a zero mean. The Kalman filter may estimate a location of the non-anchor UE based on previous estimates.

In yet another implementation, the confidence value may be based on whether a noise variance of the innovation of the Kalman filter is within a variance range of the position reference signal noise variance. In another implementation, the confidence value may be based on whether the position estimate output of the Kalman filter is less than a pre-defined value.

In another implementation, location information jointly produced by I2V ranging and GPS is stabilized. In this implementation, the confidence value is based on an innovation variance or an estimated location variance of location information jointly produced by I2V ranging and GPS. For example, a confidence value of a position estimate may be above the confidence threshold if the innovation variance or the estimated location variance is within a variance range.

In another implementation, location information jointly produced by different sensors, such as a GPS sensor and/or a speed sensor, is stabilized. In this implementation, the confidence value is based on an innovation variance or an estimated location variance of location information jointly produced by different sensors. In this example, a confidence value of a position estimate may be above the confidence threshold if an innovation variance or an estimated location variance is within a variance range.

Aspects of the present disclosure may improve an accuracy of infrastructure-to-vehicle (I2V) and vehicle-to-vehicle (V2V) positioning estimates. Additionally, based on aspects of the present disclosure, receivers may discriminate between position reference signal sources, such that a receiver may only use position reference signals from anchor devices or position reference signals from sources with a certain confidence. For example, receivers may only use position reference signals from vehicles with position estimates that are greater than a confidence value, as well as position reference signals from RSUs. As described, the position reference signals may be used for positioning.

As indicated above, FIGS. 7A, 7B, 8, and 9 are provided as examples. Other examples may differ from what is described with respect to FIGS. 7A, 7B, 8, and 9.

Figure 10:
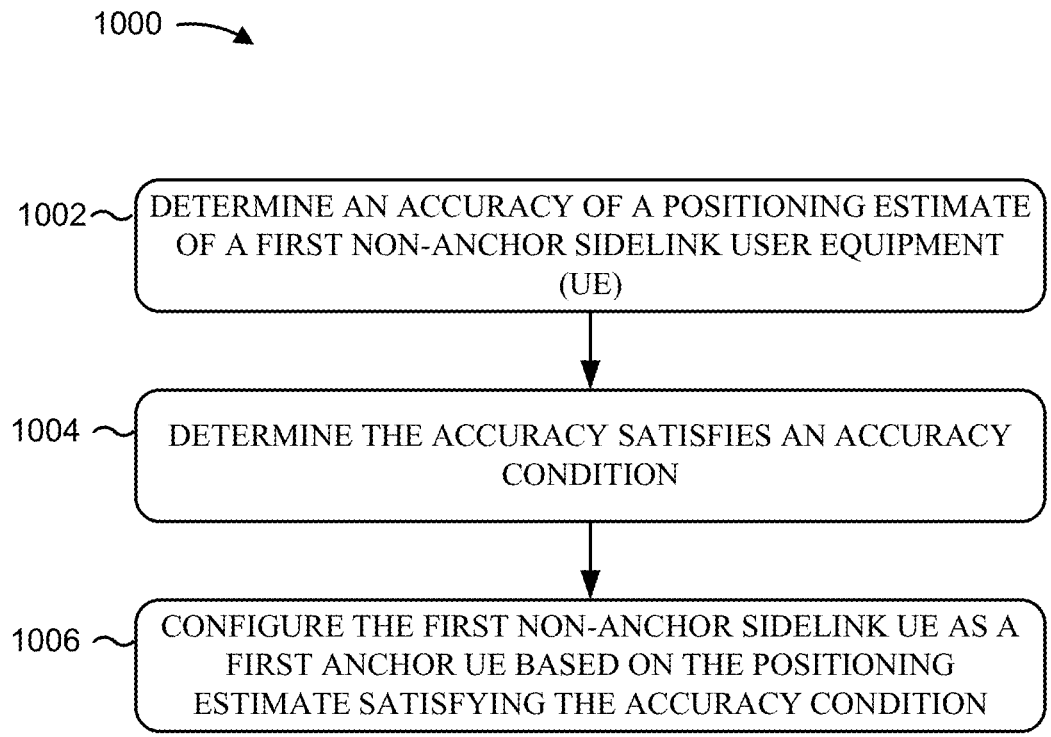
FIG. 10 is a diagram illustrating an example process performed, for example, by a positioning entity, in accordance with various aspects of the present disclosure.

FIG. 10 is a diagram illustrating an example process 1000 performed for example, by a positioning entity, such as a user equipment (UE), in accordance with various aspects of the present disclosure. The example process 1000 is an example of enabling UE positioning anchors for vehicle-to-everything (V2X), vehicle-to-vehicle (V2V), and vehicle-to-pedestrian (V2P) positioning.

As shown in FIG. 10 in some aspects, the process 1000 may include determining an accuracy of a positioning estimate of a first non-anchor sidelink UE (block 1002). For example, the positioning entity (e.g., using the controller/processor 359, and/or memory 360) can determine an accuracy of a positioning estimate of a first non-anchor sidelink UE.

As shown in FIG. 10 in some aspects, the process 1000 may include determining the accuracy satisfies an accuracy condition (block 1004). For example, the positioning entity (e.g., using the controller/processor 359, and/or memory 360) can determine the accuracy satisfies an accuracy condition. Additionally, the process 1000 may include configuring the first non-anchor sidelink UE as a first anchor UE based on the positioning estimate satisfying the accuracy condition. For example, the positioning entity (e.g., using the antenna 352, RX/TX 354, RX processor 356, TX processor 368, controller/processor 359, and/or memory 360) can configure the first non-anchor sidelink UE as a first anchor UE based on the positioning estimate satisfying the accuracy condition.

Figure 11:
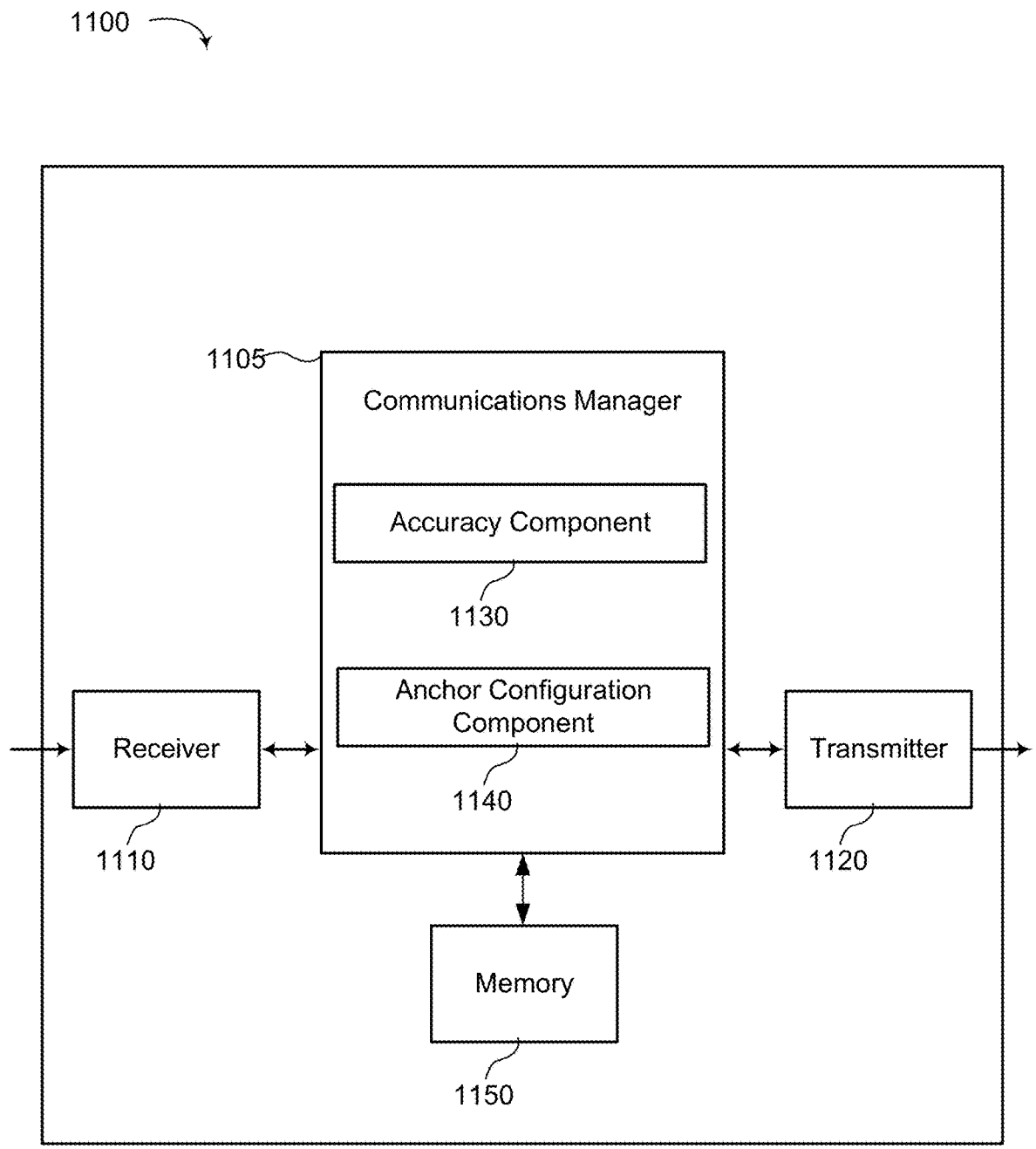
FIG. 11 is a block diagram illustrating an example of a wireless communication device that supports configuring a non-anchor sidelink user equipment (UE) as an anchor UE, in accordance with aspects of the present disclosure.

FIG. 11 is a block diagram illustrating an example of a wireless communication device 1100 that supports configuring a non-anchor UE as an anchor UE, in accordance with aspects of the present disclosure. The device 1100 may be an example of aspects of a non-anchor sidelink UE or an second anchor UE, such as a UE 104, a transmitter UE 504, a receiving UE 502, an RSU 510, the first vehicle 904, the second vehicle 906, the pedestrian 908, and the RSU 902 as described with reference to FIGS. 1, 5, and 9. The wireless communication device 1100 may include a receiver 1110, a communications manager 1105, a transmitter 1120, an accuracy component 1130, and an anchor configuration component 1140, which may be in communication with one another (for example, via one or more buses). In some examples, the wireless communication device 1100 is configured to perform operations, including operations of the process 1000 described below with reference to FIG. 10.

In some examples, the wireless communication device 1100 can include a chip, chipset, package, or device that includes at least one processor and at least one modem (for example, a 5G modem or other cellular modem). In some examples, the communications manager 1105, or its subcomponents, may be separate and distinct components. In some examples, at least some components of the communications manager 1105 are implemented at least in part as software stored in a memory 1150. The memory 1150 may be an example of the memory 360 described with reference to FIG. 3. The memory 1150 may be read only memory (ROM), programmable ROM (PROM), electronic programmable ROM (EPROM), electronic erasable PROM (EEPROM), flash memory, random access memory (RAM), or other types of volatile or non-volatile memory. The RAM may be, for example, synchronous RAM (SRAM), dynamic RAM (DRAM), synchronous DRAM (SDRAM), double data rate SDRAM (DDR SDRAM), enhanced SDRAM (ESDRAM), sync link DRAM, (SLDRAM), direct RAM bus RAM (DRRAM), or other types of RAM. Additionally, portions of one or more of the components of the communications manager 1105 can be implemented as non-transitory code executable by the processor to perform the functions or operations of the respective component.

The receiver 1110 may receive one or more of reference signals (for example, periodically configured channel state information reference signals (CSI-RSs), aperiodically configured CSI-RSs, or multi-beam-specific reference signals), synchronization signals (for example, synchronization signal blocks (SSBs)), control information and data information, such as in the form of packets, from one or more other wireless communication devices via various channels including control channels (for example, a PDCCH) and data channels (for example, a PDSCH). The other wireless communication devices may include, but are not limited to, a base station 110 described with reference to FIG. 1.

The received information may be passed on to other components of the device 1100. The receiver 1110 may be an example of aspects of the receive processor 356 described with reference to FIG. 3. The receiver 1110 may include a set of radio frequency (RF) chains that are coupled with or otherwise utilize a set of antennas (for example, the set of antennas may be an example of aspects of the antennas 252a through 252r described with reference to FIG. 2).

The transmitter 1120 may transmit signals generated by the communications manager 1105 or other components of the wireless communication device 1100. In some examples, the transmitter 1120 may be collocated with the receiver 1110 in a transceiver. The transmitter 1120 may be an example of aspects of the transmit processor 368 described with reference to FIG. 3. The transmitter 1120 may be coupled with or otherwise utilize a set of antennas (for example, the set of antennas may be an example of aspects of the antenna 354 described with reference to FIG. 3), which may be antenna elements shared with the receiver 1110. In some examples, the transmitter 1120 is configured to transmit control information in a PUCCH and data in a PUSCH. The transmitter 1120 and the receiver 1110 may be components of a wireless interface, such as NR, wide area network (WAN), Palo Alto network (PAN), wireless local area network (WLAN), or other types of wireless interfaces.

The communications manager 1105 may be an example of aspects of the controller/processor 359 described with reference to FIG. 3. The communications manager 1105 may be one or more processors such as a general purpose or application processor, DSP, communication processor, or other processor, or one or more combinations thereof. The communications manager 1105 may include the accuracy component 1130 and the anchor configuration component 1140. In some implementations, working in conjunction with the receiver 1110 and the memory 1150, the accuracy component 1130 may determine an accuracy of a positioning estimate of a first non-anchor sidelink UE and also determine whether the accuracy satisfies an accuracy condition. That is, the accuracy component 1130 may determine the accuracy satisfies or does not satisfy an accuracy condition. In some implementations, working in conjunction with the transmitter 1120 and the accuracy component 1130, the anchor configuration component 1140 may configure the first non-anchor sidelink UE as a first anchor UE based on the positioning estimate satisfying the accuracy condition.

Figure 12:
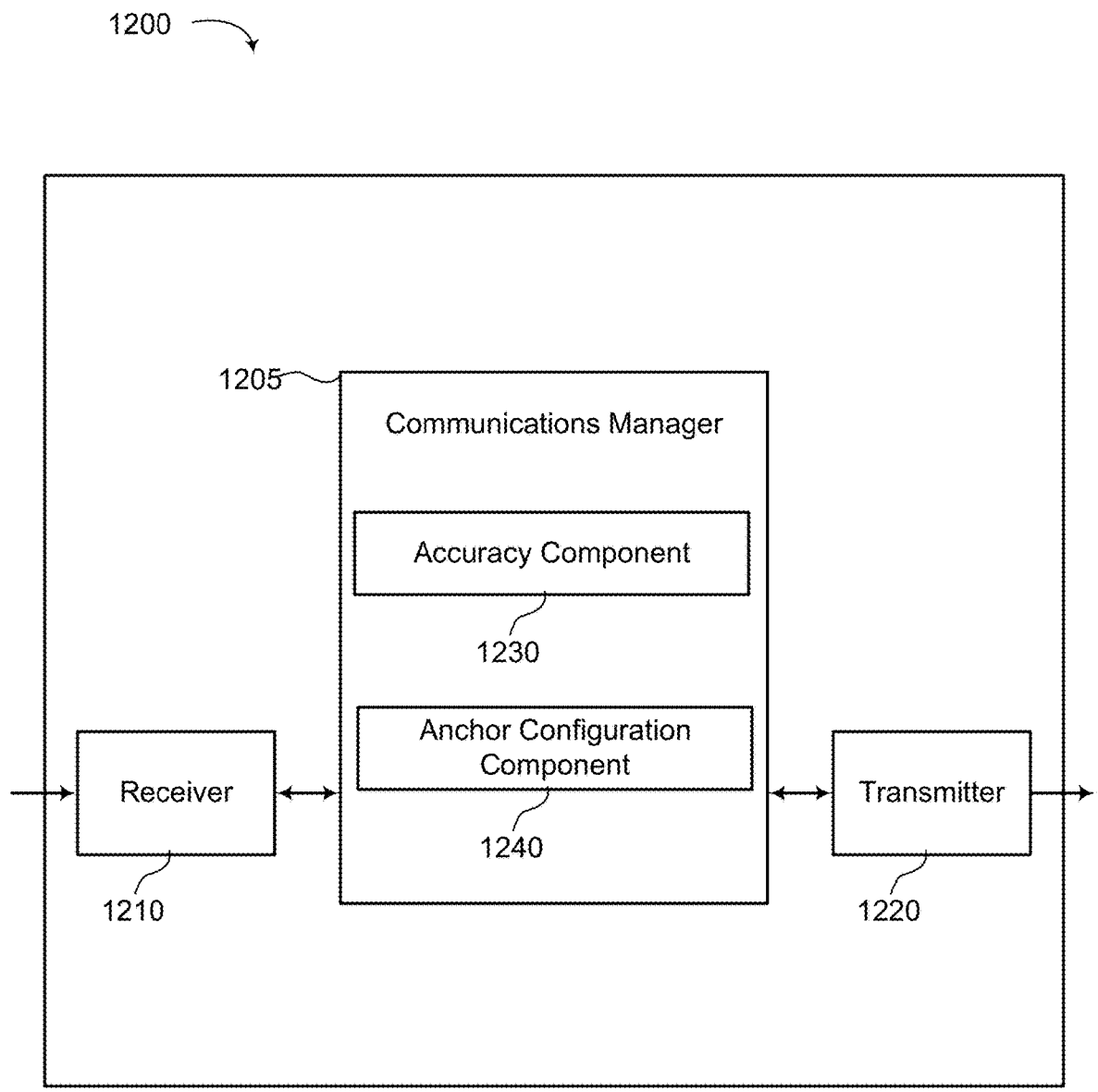
FIG. 12 is a block diagram illustrating an example of a wireless communication device that supports configuring a non-anchor sidelink UE as an anchor UE, in accordance with aspects of the present disclosure.

FIG. 12 is a block diagram illustrating an example of a wireless communication device 1200 that supports configuring a non-anchor UE as an anchor UE, in accordance with aspects of the present disclosure. The device 1200 may be an example of aspects of a sidelink server, such as a base station 102, a gNB 508, base station 910 as described with reference to FIGS. 1, 5, and 9. The wireless communication device 1200 may include a receiver 1210, a communications manager 1205, a transmitter 1220, an accuracy component 1230, and an anchor configuration component 1240, which may be in communication with one another (for example, via one or more buses). In some examples, the wireless communication device 1200 is configured to perform operations, including operations of the process 1000 described below with reference to FIG. 10.

In some examples, the wireless communication device 1200 can include a chip, chipset, package, or device that includes at least one processor and at least one modem (for example, a 5G modem or other cellular modem). In some examples, the communications manager 1205, or its subcomponents, may be separate and distinct components. In some examples, at least some components of the communications manager 1205 are implemented at least in part as software stored in a memory 1250. The memory 1250 may be an example of the memory 376 described with reference to FIG. 3. The memory 1250 may be read only memory (ROM), programmable ROM (PROM), electronic programmable ROM (EPROM), electronic erasable PROM (EEPROM), flash memory, random access memory (RAM), or other types of volatile or non-volatile memory. The RAM may be, for example, synchronous RAM (SRAM), dynamic RAM (DRAM), synchronous DRAM (SDRAM), double data rate SDRAM (DDR SDRAM), enhanced SDRAM (ESDRAM), sync link DRAM, (SLDRAM), direct RAM bus RAM (DRRAM), or other types of RAM. Additionally, portions of one or more of the components of the communications manager 1205 can be implemented as non-transitory code executable by the processor to perform the functions or operations of the respective component.

The receiver 1210 may receive one or more of reference signals (for example, periodically configured channel state information reference signals (CSI-RSs), aperiodically configured CSI-RSs, or multi-beam-specific reference signals), synchronization signals (for example, synchronization signal blocks (SSBs)), control information and data information, such as in the form of packets, from one or more other wireless communication devices via various channels including control channels (for example, a PUCCH) and data channels (for example, a PUSCH). The other wireless communication devices may include, but are not limited to, a UE 104 described with reference to FIG. 1.

The received information may be passed on to other components of the device 1200. The receiver 1210 may be an example of aspects of the receive processor 370 described with reference to FIG. 3. The receiver 1210 may include a set of radio frequency (RF) chains that are coupled with or otherwise utilize a set of antennas (for example, the set of antennas may be an example of aspects of the antennas 252a through 252r described with reference to FIG. 2).

The transmitter 1220 may transmit signals generated by the communications manager 1205 or other components of the wireless communication device 1200. In some examples, the transmitter 1220 may be collocated with the receiver 1210 in a transceiver. The transmitter 1220 may be an example of aspects of the transmit processor 316 described with reference to FIG. 3. The transmitter 1220 may be coupled with or otherwise utilize a set of antennas (for example, the set of antennas may be an example of aspects of the antenna 320 described with reference to FIG. 3), which may be antenna elements shared with the receiver 1210. In some examples, the transmitter 1220 is configured to transmit control information in a PUCCH and data in a PUSCH. The transmitter 1220 and the receiver 1210 may be components of a wireless interface, such as NR, wide area network (WAN), Palo Alto network (PAN), wireless local area network (WLAN), or other types of wireless interfaces.

The communications manager 1205 may be an example of aspects of the controller/processor 375 described with reference to FIG. 3. The communications manager 1205 may be one or more processors such as a general purpose or application processor, DSP, communication processor, or other processor, or one or more combinations thereof. The communications manager 1205 may include the accuracy component 1230 and the anchor configuration component 1240. In some implementations, working in conjunction with the receiver 1210 and the memory 1250, the accuracy component 1230 may determine an accuracy of a positioning estimate of a first non-anchor sidelink UE and also determine whether the accuracy satisfies an accuracy condition. That is, the accuracy component 1230 may determine the accuracy satisfies or does not satisfy an accuracy condition. In some implementations, working in conjunction with the transmitter 1220 and the accuracy component 1230, the anchor configuration component 1240 may configure the first non-anchor sidelink UE as a first anchor UE based on the positioning estimate satisfying the accuracy condition.

Implementation examples are described in the following numbered clauses:

1. A method of wireless communication by a positioning entity, comprising:
determining an accuracy of a positioning estimate of a first non-anchor sidelink user equipment (UE);
determining the accuracy satisfies an accuracy condition; and
configuring the first non-anchor sidelink UE as a first anchor UE based on the positioning estimate satisfying the accuracy condition.

2. The method of clause 1, in which the positioning entity is the first non-anchor sidelink UE, a second anchor UE, or a sidelink server.

3. The method of any of clauses 1-2, in which:
determining the accuracy comprises determining a confidence value of the positioning estimate; and
determining the accuracy satisfies the accuracy condition comprises determining the confidence values is greater than a confidence threshold configured at the positioning entity.

4. The method of clause 3, in which the confidence value is based on at least one of a comparison of a predicted observation error variance and an expected observation error variance, a first independent sensor estimate coinciding with the positioning estimate; the first independent sensor estimate coinciding with a second independent sensor estimate, a previous innovation from a Kalman filter, or a combination thereof.

5. The method of any of clauses 1-4, further comprising:
transmitting a positioning reference signal (PRS) to a second non-anchor sidelink UE; and
indicating an anchor status along with the PRS.

6. The method of clause 5, further comprising indicating the anchor status with a sequence of the PRS or in a message coupled to the PRS.

7. The method of clause 5, further comprising transmitting an intelligent transportation system (ITS) message when the positioning entity is an anchor device.

8. The method of clause 5, further comprising refraining from transmitting an intelligent transportation system (ITS) message when the positioning entity is not an anchor device.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described and in Appendix A may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communication by a first sidelink user equipment (UE), comprising:
   determining an accuracy of a positioning estimate of the first sidelink UE having a non-anchor UE configuration;
   determining the accuracy satisfies an accuracy condition;
   configuring the first sidelink UE with an anchor UE configuration based on the positioning estimate satisfying the accuracy condition; and
   transmitting, to a second sidelink UE, an anchor status message via a positioning reference signal (PRS) based on the first sidelink UE being configured with the anchor UE configuration, the second sidelink UE having a non-anchor UE configuration, the anchor status message indicating the first sidelink UE is configured with the anchor UE configuration.

2. The method of claim 1, further comprising determining a confidence value of the positioning estimate, wherein the accuracy condition is satisfied based on the confidence value being greater than a confidence threshold configured at the first sidelink UE.

3. The method of claim 2, wherein the confidence value is based on at least one of a comparison of a predicted observation error variance and an expected observation error variance, a first independent sensor estimate coinciding with the positioning estimate; the first independent sensor estimate coinciding with a second independent sensor estimate, a previous innovation from a Kalman filter, or a combination thereof.

4. The method of claim 1, wherein the anchor status message is included with a sequence of the PRS or coupled to the PRS.

5. The method of claim 1, further comprising transmitting an intelligent transportation system (ITS) message when the first sidelink UE is configured with the anchor UE configuration.

6. The method of claim 1, further comprising refraining from transmitting an intelligent transportation system (ITS) message when the first sidelink UE is not configured with the anchor UE configuration.

7. An apparatus for wireless communication by a first sidelink user equipment (UE), comprising:
   means for determining an accuracy of a positioning estimate of the first sidelink UE having a non-anchor UE configuration;
   means for determining the accuracy satisfies an accuracy condition;
   means for configuring the first sidelink UE with an anchor UE configuration based on the positioning estimate satisfying the accuracy condition; and
   means for transmitting, to a second sidelink UE, an anchor status message via a positioning reference signal (PRS) based on the first sidelink UE being configured with the anchor UE configuration, the second sidelink UE having a non-anchor UE configuration, the anchor status message indicating the first sidelink UE is configured with the anchor UE configuration.

8. The apparatus of claim 7, wherein the positioning entity is the first sidelink UE, a third UE with an anchor UE configuration, or a sidelink server.

9. The apparatus of claim 7, further comprising means for determining a confidence value of the positioning estimate, wherein the accuracy condition is satisfied based on the confidence value being greater than a confidence threshold configured at the first sidelink UE.

10. The apparatus of claim 9, wherein the confidence value is based on at least one of a comparison of a predicted observation error variance and an expected observation error variance, a first independent sensor estimate coinciding with the positioning estimate; the first independent sensor estimate coinciding with a second independent sensor estimate, a previous innovation from a Kalman filter, or a combination thereof.

11. The apparatus of claim 7, wherein the anchor status message is included with a sequence of the PRS or coupled to the PRS.

12. The apparatus of claim 7, further comprising means for transmitting an intelligent transportation system (ITS) message when the first sidelink UE is configured with the anchor UE configuration.

13. The apparatus of claim 7, further comprising means for refraining from transmitting an intelligent transportation system (ITS) message when the first sidelink UE is not configured with the anchor UE configuration.

14. An apparatus for wireless communication by a first sidelink user equipment (UE), comprising:
   memory;
   an at least one communications interface; and
   one or more processors, communicatively connected to the memory and the at least one communications interface, the one or more processors configured to:
     determine an accuracy of a positioning estimate of the first sidelink UE having a non-anchor UE configuration;
     determine the accuracy satisfies an accuracy condition;
     configure the first sidelink UE with an anchor UE configuration based on the positioning estimate satisfying the accuracy condition; and
     transmit, to a second sidelink UE, an anchor status message via a positioning reference signal (PRS) based on the first sidelink UE being configured with the anchor UE configuration, the second sidelink UE having a non-anchor UE configuration, the anchor status message indicating the first sidelink UE is configured with the anchor UE configuration.

15. The apparatus of claim 14, wherein:
   the processor is further configured to determine a confidence value of the positioning estimate; and
   the accuracy condition is satisfied based on the confidence value being greater than a confidence threshold configured at the first sidelink UE.

16. The apparatus of claim 15, wherein the confidence value is based on at least one of a comparison of a predicted observation error variance and an expected observation error variance, a first independent sensor estimate coinciding with the positioning estimate; the first independent sensor estimate coinciding with a second independent sensor estimate, a previous innovation from a Kalman filter, or a combination thereof.

17. The apparatus of claim 14, wherein the anchor status message is included with a sequence of the PRS or coupled to the PRS.

18. The apparatus of claim 14, wherein the processor is further configured to: transmit an intelligent transportation system (ITS) message when the first sidelink UE is configured with the anchor UE configuration.

19. The apparatus of claim 14, wherein the processor is further configured to: refrain from transmitting an intelligent transportation system (ITS) message when the first sidelink UE is not configured with the anchor UE configuration.

20. A non-transitory computer-readable medium having program code recorded thereon for wireless communication by a first sidelink user equipment (UE), the program code executed by one or more processors and comprising:
   program code to determine an accuracy of a positioning estimate of the first UE having a non-anchor UE configuration;
   program code to determine the accuracy satisfies an accuracy condition;
   program code to configure the first sidelink UE with an anchor UE configuration based on the positioning estimate satisfying the accuracy condition; and
   program code to transmit, to a second sidelink UE, an anchor status message via a positioning reference signal (PRS) based on the first sidelink UE being configured with the anchor UE configuration, the second sidelink UE having a non-anchor UE configuration, the anchor status message indicating the first sidelink UE is configured with the anchor UE configuration.

21. The non-transitory computer-readable medium of claim 20, wherein:
   the program code further comprises program code to determine a confidence value of the positioning estimate; and
   the accuracy condition is satisfied based on the confidence value being greater than a confidence threshold configured at the first sidelink UE.

22. The non-transitory computer-readable medium of claim 21, wherein the confidence value is based on at least one of a comparison of a predicted observation error variance and an expected observation error variance, a first independent sensor estimate coinciding with the positioning estimate; the first independent sensor estimate coinciding with a second independent sensor estimate, a previous innovation from a Kalman filter, or a combination thereof.

23. The non-transitory computer-readable medium of claim 20, wherein the anchor status message is included with a sequence of the PRS or coupled to the PRS.

\* \* \* \* \*